(12) United States Patent
Bodin et al.

(10) Patent No.: US 7,996,754 B2
(45) Date of Patent: Aug. 9, 2011

(54) CONSOLIDATED CONTENT MANAGEMENT

(75) Inventors: William K. Bodin, Austin, TX (US); David Jaramillo, Lake Worth, FL (US); Jerry W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 11/352,760

(22) Filed: Feb. 13, 2006

(65) Prior Publication Data
US 2007/0192684 A1 Aug. 16, 2007

(51) Int. Cl.
*G06F 17/00* (2006.01)

(52) U.S. Cl. .................... 715/203; 715/248

(58) Field of Classification Search ............ 715/243, 715/201, 202, 203, 209, 248, 255, 273
See application file for complete search history.

(56) References Cited

U.S. PATENT DOCUMENTS

| | | | |
|---|---|---|---|
| 5,819,220 A | 10/1998 | Sarukkai et al. | |
| 5,892,825 A * | 4/1999 | Mages et al. | 705/51 |
| 5,901,287 A | 5/1999 | Bull et al. | |
| 5,911,776 A * | 6/1999 | Guck | 709/217 |
| 6,032,260 A | 2/2000 | Sasmazel et al. | |
| 6,141,693 A | 10/2000 | Perlman et al. | |
| 6,178,511 B1 | 1/2001 | Cohen et al. | |
| 6,240,391 B1 | 5/2001 | Ball et al. | |
| 6,266,649 B1 | 7/2001 | Linden et al. | |
| 6,311,194 B1 * | 10/2001 | Sheth et al. | 715/236 |
| 6,463,440 B1 | 10/2002 | Hind et al. | |
| 6,519,617 B1 | 2/2003 | Wanderski et al. | |
| 6,771,743 B1 | 8/2004 | Butler et al. | |
| 6,912,691 B1 | 6/2005 | Dodrill et al. | |
| 6,944,591 B1 | 9/2005 | Raghunandan | |
| 6,965,569 B1 | 11/2005 | Carolan et al. | |
| 6,976,082 B1 | 12/2005 | Ostermann et al. | |
| 6,993,476 B1 | 1/2006 | Dutta et al. | |
| 7,039,643 B2 | 5/2006 | Sena et al. | |
| 7,046,772 B1 | 5/2006 | Moore et al. | |
| 7,062,437 B2 | 6/2006 | Kovales et al. | |
| 7,120,702 B2 * | 10/2006 | Huang et al. | 709/246 |
| 7,130,850 B2 | 10/2006 | Russell-Falla et al. | |
| 7,171,411 B1 | 1/2007 | Lewis et al. | |

(Continued)

FOREIGN PATENT DOCUMENTS

WO WO 0182139 11/2001

(Continued)

OTHER PUBLICATIONS

Buchanan et al.,"Representing Aggregated Works in the Digital Library", ACM, 2007, pp. 247-256.*

(Continued)

*Primary Examiner* — Laurie Ries
(74) *Attorney, Agent, or Firm* — The Brevetto Law Group

(57) ABSTRACT

Methods, systems, and products are disclosed for consolidated content management for delivery to a rendering device. Embodiments include aggregating, for a user, content of disparate data types from disparate data sources; synthesizing the aggregated content of disparate data types into synthesized content of a data type for delivery to a particular rendering device; receiving from the rendering device a request for the synthesized content; and transmitting, in a response to the request, the requested synthesized content to the rendering device.

15 Claims, 17 Drawing Sheets

U.S. PATENT DOCUMENTS

| Number | Kind | Date | Inventor | Ref |
|---|---|---|---|---|
| 7,313,528 | B1 | 12/2007 | Miller | |
| 7,356,470 | B2* | 4/2008 | Roth et al. | 704/270 |
| 7,366,712 | B2* | 4/2008 | He et al. | 1/1 |
| 7,437,408 | B2* | 10/2008 | Schwartz et al. | 709/204 |
| 7,454,346 | B1 | 11/2008 | Dodrill et al. | |
| 7,657,006 | B2* | 2/2010 | Woodring | 379/88.06 |
| 7,685,525 | B2* | 3/2010 | Kumar et al. | 715/744 |
| 7,890,517 | B2* | 2/2011 | Angelo et al. | 707/752 |
| 2001/0027396 | A1 | 10/2001 | Sato | |
| 2001/0040900 | A1* | 11/2001 | Salmi et al. | 370/487 |
| 2001/0047349 | A1 | 11/2001 | Easty et al. | |
| 2001/0049725 | A1 | 12/2001 | Kosuge | |
| 2001/0054074 | A1 | 12/2001 | Hayashi | |
| 2002/0013708 | A1 | 1/2002 | Walker et al. | |
| 2002/0032564 | A1 | 3/2002 | Ehsani et al. | |
| 2002/0032776 | A1 | 3/2002 | Hasegawa et al. | |
| 2002/0054090 | A1 | 5/2002 | Silva et al. | |
| 2002/0062216 | A1 | 5/2002 | Guenther et al. | |
| 2002/0062393 | A1 | 5/2002 | Borger et al. | |
| 2002/0083013 | A1 | 6/2002 | Rollins et al. | |
| 2002/0095292 | A1 | 7/2002 | Mittal et al. | |
| 2002/0152210 | A1 | 10/2002 | Johnson et al. | |
| 2002/0178007 | A1 | 11/2002 | Slotznick et al. | |
| 2002/0194286 | A1 | 12/2002 | Matsuura et al. | |
| 2002/0194480 | A1 | 12/2002 | Nagao | |
| 2002/0198720 | A1 | 12/2002 | Takagi et al. | |
| 2003/0028380 | A1 | 2/2003 | Freeland et al. | |
| 2003/0033331 | A1 | 2/2003 | Sena et al. | |
| 2003/0055868 | A1* | 3/2003 | Fletcher et al. | 709/201 |
| 2003/0103606 | A1 | 6/2003 | Rhie et al. | |
| 2003/0110272 | A1 | 6/2003 | du Castel et al. | |
| 2003/0110297 | A1 | 6/2003 | Tabatabai et al. | |
| 2003/0115056 | A1 | 6/2003 | Gusler et al. | |
| 2003/0115064 | A1 | 6/2003 | Gusler et al. | |
| 2003/0126293 | A1 | 7/2003 | Bushey | |
| 2003/0132953 | A1 | 7/2003 | Johnson et al. | |
| 2003/0158737 | A1 | 8/2003 | Csicsatka | |
| 2003/0160770 | A1 | 8/2003 | Zimmerman | |
| 2003/0167234 | A1 | 9/2003 | Bodmer et al. | |
| 2003/0172066 | A1 | 9/2003 | Cooper et al. | |
| 2003/0188255 | A1 | 10/2003 | Shimizu et al. | |
| 2003/0212654 | A1* | 11/2003 | Harper et al. | 707/1 |
| 2003/0225599 | A1* | 12/2003 | Mueller et al. | 705/5 |
| 2003/0229847 | A1 | 12/2003 | Kim | |
| 2004/0003394 | A1 | 1/2004 | Ramaswamy | |
| 2004/0034653 | A1* | 2/2004 | Maynor et al. | 707/102 |
| 2004/0041835 | A1 | 3/2004 | Lu | |
| 2004/0068552 | A1 | 4/2004 | Kotz et al. | |
| 2004/0088349 | A1 | 5/2004 | Beck et al. | |
| 2004/0107125 | A1* | 6/2004 | Guheen et al. | 705/7 |
| 2004/0128276 | A1* | 7/2004 | Scanlon et al. | 707/1 |
| 2004/0199375 | A1 | 10/2004 | Ehsani et al. | |
| 2004/0201609 | A1 | 10/2004 | Obrador | |
| 2004/0254851 | A1 | 12/2004 | Himeno et al. | |
| 2005/0015254 | A1 | 1/2005 | Bearman | |
| 2005/0045373 | A1 | 3/2005 | Born | |
| 2005/0071780 | A1 | 3/2005 | Muller et al. | |
| 2005/0076365 | A1 | 4/2005 | Popov et al. | |
| 2005/0108521 | A1 | 5/2005 | Silhavy et al. | |
| 2005/0144022 | A1* | 6/2005 | Evans | 705/1 |
| 2005/0203959 | A1 | 9/2005 | Muller et al. | |
| 2005/0232242 | A1 | 10/2005 | Karaoguz et al. | |
| 2005/0251513 | A1* | 11/2005 | Tenazas | 707/3 |
| 2006/0008258 | A1 | 1/2006 | Kawana et al. | |
| 2006/0020662 | A1 | 1/2006 | Robinson | |
| 2006/0031447 | A1* | 2/2006 | Holt et al. | 709/223 |
| 2006/0048212 | A1 | 3/2006 | Tsuruoka et al. | |
| 2006/0050794 | A1 | 3/2006 | Tan et al. | |
| 2006/0052089 | A1 | 3/2006 | Khurana et al. | |
| 2006/0075224 | A1 | 4/2006 | Tao | |
| 2006/0095848 | A1 | 5/2006 | Naik | |
| 2006/0114987 | A1 | 6/2006 | Roman | |
| 2006/0123082 | A1 | 6/2006 | Digate et al. | |
| 2006/0136449 | A1 | 6/2006 | Parker et al. | |
| 2006/0140360 | A1 | 6/2006 | Crago et al. | |
| 2006/0149781 | A1* | 7/2006 | Blankinship | 707/103 R |
| 2006/0155698 | A1 | 7/2006 | Vayssiere | |
| 2006/0159109 | A1 | 7/2006 | Lamkin et al. | |
| 2006/0168507 | A1 | 7/2006 | Hansen | |
| 2006/0173985 | A1 | 8/2006 | Moore | |
| 2006/0184679 | A1 | 8/2006 | Izdepski et al. | |
| 2006/0190616 | A1 | 8/2006 | Mayerhofer et al. | |
| 2006/0206533 | A1* | 9/2006 | MacLaurin et al. | 707/200 |
| 2006/0224739 | A1 | 10/2006 | Anantha | |
| 2006/0233327 | A1 | 10/2006 | Roberts et al. | |
| 2006/0265503 | A1 | 11/2006 | Jones et al. | |
| 2006/0282317 | A1 | 12/2006 | Rosenberg | |
| 2006/0288011 | A1 | 12/2006 | Gandhi et al. | |
| 2007/0027958 | A1 | 2/2007 | Haslam | |
| 2007/0043759 | A1 | 2/2007 | Bodin et al. | |
| 2007/0061229 | A1 | 3/2007 | Ramer et al. | |
| 2007/0061266 | A1 | 3/2007 | Moore et al. | |
| 2007/0073728 | A1 | 3/2007 | Klein et al. | |
| 2007/0077921 | A1 | 4/2007 | Hayashi et al. | |
| 2007/0078655 | A1 | 4/2007 | Semkow et al. | |
| 2007/0083540 | A1 | 4/2007 | Gundia et al. | |
| 2007/0091206 | A1 | 4/2007 | Bloebaum | |
| 2007/0100836 | A1 | 5/2007 | Eichstaedt et al. | |
| 2007/0101274 | A1* | 5/2007 | Kurlander et al. | 715/744 |
| 2007/0112844 | A1 | 5/2007 | Tribble et al. | |
| 2007/0118426 | A1 | 5/2007 | Barnes, Jr. | |
| 2007/0124458 | A1 | 5/2007 | Kumar | |
| 2007/0124802 | A1 | 5/2007 | Anton et al. | |
| 2007/0130589 | A1 | 6/2007 | Davis et al. | |
| 2007/0147274 | A1 | 6/2007 | Vasa et al. | |
| 2007/0150512 | A1* | 6/2007 | Kong et al. | 707/104.1 |
| 2007/0174326 | A1 | 7/2007 | Schwartz et al. | |
| 2007/0191008 | A1 | 8/2007 | Bucher et al. | |
| 2007/0192327 | A1 | 8/2007 | Bodin | |
| 2007/0192674 | A1 | 8/2007 | Bodin | |
| 2007/0192683 | A1 | 8/2007 | Bodin | |
| 2007/0192684 | A1 | 8/2007 | Bodin et al. | |
| 2007/0208687 | A1 | 9/2007 | O'Connor et al. | |
| 2007/0213857 | A1 | 9/2007 | Bodin | |
| 2007/0213986 | A1 | 9/2007 | Bodin | |
| 2007/0214147 | A1 | 9/2007 | Bodin et al. | |
| 2007/0214148 | A1 | 9/2007 | Bodin | |
| 2007/0214149 | A1 | 9/2007 | Bodin | |
| 2007/0214485 | A1 | 9/2007 | Bodin | |
| 2007/0220024 | A1 | 9/2007 | Putterman et al. | |
| 2007/0253699 | A1 | 11/2007 | Yen et al. | |
| 2007/0276837 | A1 | 11/2007 | Bodin et al. | |
| 2007/0276865 | A1 | 11/2007 | Bodin et al. | |
| 2007/0276866 | A1 | 11/2007 | Bodin et al. | |
| 2007/0277088 | A1 | 11/2007 | Bodin | |
| 2007/0277233 | A1 | 11/2007 | Bodin | |
| 2008/0034278 | A1 | 2/2008 | Tsou et al. | |
| 2008/0052415 | A1 | 2/2008 | Kellerman et al. | |
| 2008/0082576 | A1 | 4/2008 | Bodin | |
| 2008/0082635 | A1 | 4/2008 | Bodin | |
| 2008/0161948 | A1 | 7/2008 | Bodin | |
| 2008/0162131 | A1 | 7/2008 | Bodin | |
| 2008/0275893 | A1 | 11/2008 | Bodin et al. | |

FOREIGN PATENT DOCUMENTS

WO  WO 2005/106846  11/2005

OTHER PUBLICATIONS

Text to Speech MP3 with Natural Voices 1.71, Published Oct. 5, 2004.

Managing multimedia content and delivering services across multiple client platforms using XML, London Communications Symposium, xx, xx, Sep. 10, 2002, pp. 1-7.

PCT Search Report and Written Opinion International Application PCT/EP2007/050594.

Adapting Multimedia Internet Content for Universal Access, Rakesh Mohan, John R. Smith, Chung-Sheng Li, IEEE Transactions on Multimedia vol. 1, No. 1, p. 104-p. 144.

"Adapting Multimedia Internet Content for Universal Access", Rakesh Mohan, John R. Smith, Chung-Sheng Li, IEEE Transactions on Multimedia vol. 1, No. 1, p. 104-p. 114.

Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.

Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.
U.S. Appl. No. 11/352,760, filed Feb. 2006, Bodin, et al.
U.S. Appl. No. 11/352,824, filed Feb. 2006, Bodin, et al.
U.S. Appl. No. 11/352,680, filed Feb. 2006, Bodin, et al.
U.S. Appl. No. 11/352,679, filed Feb. 2006, Bodin et al.
U.S. Appl. No. 11/372,323, filed Mar. 2006, Bodin et al.
U.S. Appl. No. 11/372,318, filed Mar. 2006, Bodin et al.
U.S. Appl. No. 11/372,319, filed Mar. 2006, Bodin et al.
U.S. Appl. No. 11/536,781, filed Sep. 2006, Bodin et al.
U.S. Appl. No. 11/420,014, filed May 2006, Bodin et al.
U.S. Appl. No. 11/420,015, filed May 2006, Bodin et al.
U.S. Appl. No. 11/420,016, filed May 2006, Bodin et al.
U.S. Appl. No. 11/420,017, filed May 2006, Bodin et al.
U.S. Appl. No. 11/420,018, filed May 2006, Bodin et al.
U.S. Appl. No. 11/536,733, filed Sep. 2006, Bodin et al.
U.S. Appl. No. 11/619,216, filed Jan. 2007, Bodin et al.
U.S. Appl. No. 11/619,253, filed Jan. 2007, Bodin et al.
U.S. Appl. No. 12/178,448, filed Jul. 2008, Bodin et al.
Office Action Dated Apr. 15, 2009 in U.S. Appl. No. 11/352,760.
Final Office Action Dated Nov. 16, 2009 in U.S. Appl. No. 11/352,760.
Notice of Allowance Dated Jun. 5, 2008 in U.S. Appl. No. 11/352,824.
Office Action Dated Jan. 22, 2008 in U.S. Appl. No. 11/352,824.
Final Office Action Dated Dec. 21, 2009 in U.S. Appl. No. 11/352,680.
Office Action Dated Apr. 30, 2009 in U.S. Appl. No. 11/352,679.
Final Office Action Dated Oct. 29, 2009 in U.S. Appl. No. 11/352,679.
Office Action Dated Oct. 28, 2008 in U.S. Appl. No. 11/372,323.
Office Action Dated Mar. 18, 2008 in U.S. Appl. No. 11/372,318.
Final Office Action Dated Jul. 9, 2008 in U.S. Appl. No. 11/372,318.
Final Office Action Dated Nov. 6, 2009 in U.S. Appl. No. 11/372,329.
Office Action Dated Feb. 25, 2009 in U.S. Appl. No. 11/372,325.
Office Action Dated Feb. 27, 2009 in U.S. Appl. No. 11/372,329.
Final Office Action Dated Jan. 15, 2010 in U.S. Appl. No. 11/536,781.
Office Action Dated Mar. 20, 2008 in U.S. Appl. No. 11/420,015.
Final Office Action Dated Sep. 3, 2008 in U.S. Appl. No. 11/420,015.
Office Action Dated Dec. 2, 2008 in U.S. Appl. No. 11/420,015.
Office Action Dated Mar. 3, 2008 in U.S. Appl. No. 11/420,016.
Final Office Action Dated Aug. 29, 2008 in U.S. Appl. No. 11/420,016.
Final Office Action Dated Dec. 31, 2009 in U.S. Appl. No. 11/420,017.
Office Action Dated Mar. 21, 2008 in U.S. Appl. No. 11/420,018.
Final Office Action Dated Aug. 29, 2008 in U.S. Appl. No. 11/420,018.
Office Action Dated Dec. 3, 2008 in U.S. Appl. No. 11/420,018.
Office Action Dated Dec. 30, 2008 in U.S. Appl. No. 11/536,733.
Office Action Dated Jan. 26, 2010 in U.S. Appl. No. 11/619,216.
Office Action Dated Apr. 2, 2009 in U.S. Appl. No. 11/619,253.
Buchana et al., "Representing Aggregated Works in the Digital Library", ACM, 2007, pp. 247-256.
Office Action, U.S. Appl. No. 11/352,760, Sep. 16, 2010.
Office Action, U.S. Appl. No. 11/352,680, Jun. 10, 2010.
Final Office Action, U.S. Appl. No. 11/352,680, Sep. 7, 2010.
Office Action, U.S. Appl. No. 11/352,679, May 28, 2010.
Final Office Action, U.S. Appl. No. 11/352,679, Nov. 15, 2010.
Office Action, U.S. Appl. No. 11/372,317, Sep. 23, 2010.
Final Office Action, U.S. Appl. No. 11/372,329, Nov. 6, 2009.
Office Action, U.S. Appl. No. 11/372,319, Apr. 21, 2010.
Final Office Action, U.S. Appl. No. 11/372,319, Jul. 2, 2010.
Final Office Action, U.S. Appl. No. 11/420,014, Apr. 3, 2010.
Final Office Action, U.S. Appl. No. 11/420,017, Sep. 23, 2010.
Final Office Action, U.S. Appl. No. 11/619,216, Jun. 25, 2010.
Final Office Action, U.S. Appl. No. 11/619,236, Oct. 22, 2010.
Office Action, U.S. Appl. No. 12/178,448, Apr. 2, 2010.
Final Office Action, U.S. Appl. No. 12/178,448, Sep. 14, 2010.

* cited by examiner

CONSOLIDATED CONTENT MANAGEMENT

BACKGROUND OF THE INVENTION

1. Field of the Invention

The field of the invention is data processing, or, more specifically, methods, systems, and products for consolidated content management for delivery to a rendering device.

2. Description of Related Art

Despite having more access to content from many disparate sources and having more disparate devices to access that content, retrieving content from disparate sources with disparate devices is often cumbersome. Accessing such content is cumbersome because users typically must access content of various disparate data types from various disparate data sources individually without having a single point of access for accessing content. Content of disparate data types accessed from various disparate data sources often must also be rendered on data type-specific devices using data type-specific applications without the flexibility of rendering content on user selected devices regardless of the content's original data type. There is therefore an ongoing need for consolidated content management for delivery to a particular rendering device.

SUMMARY OF THE INVENTION

Methods, systems, and products are disclosed for consolidated content management for delivery to a rendering device. Embodiments include aggregating, for a user, content of disparate data types from disparate data sources; synthesizing the aggregated content of disparate data types into synthesized content of a data type for delivery to a particular rendering device; receiving from the rendering device a request for the synthesized content; and transmitting, in a response to the request, the requested synthesized content to the rendering device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary Architecture for Consolidated Content Management

Figure 1:
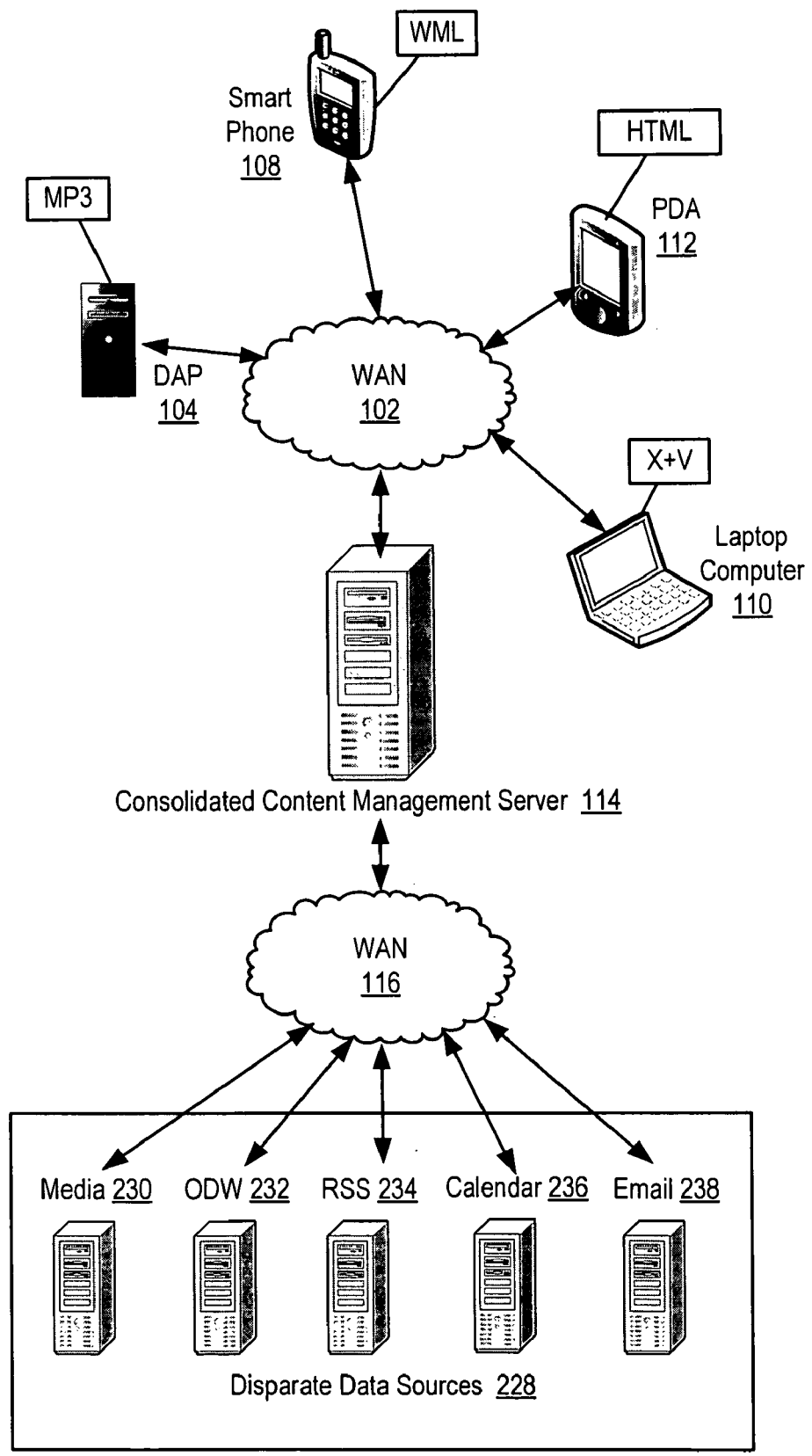
FIG. 1 sets forth a network diagram illustrating an exemplary system for consolidated content management for delivery to a rendering device according to embodiments of the present invention.

Exemplary methods, systems, and products for consolidated content management for delivery to a rendering device according to embodiments of the present invention are described with reference to the accompanying drawings, beginning with FIG. 1. FIG. 1 sets forth a network diagram illustrating an exemplary system for consolidated content management for delivery to a rendering device according to embodiments of the present invention. The system of FIG. 1 operates generally for consolidated content management for delivery to a rendering device by aggregating, for a user, content of disparate data types from disparate data sources; synthesizing the aggregated content of disparate data types into synthesized content including data of a uniform data type for delivery to a particular rendering device; receiving from the rendering device a request for the synthesized content; and transmitting, in a response to the request, the requested synthesized content to the rendering device.

Content of disparate data types are content of data of different kind and form. That is, disparate data types are data of different kinds. The distinctions that define the disparate data types may include a difference in data structure, file format, protocol in which the data is transmitted, application used to render the data, and other distinctions as will occur to those of skill in the art. Examples of disparate data types include MPEG-1 Audio Layer 3 ('MP3') files, eXtensible markup language documents ('XML'), email documents, word processing documents, calendar data, and so on as will occur to those of skill in the art. Disparate data types often rendered on data type-specific devices. For example, an MPEG-1 Audio Layer 3 ('MP3') file is typically played by an MP3 player, a Wireless Markup Language ('WML') file is typically accessed by a wireless device, and so on.

The term disparate data sources means sources of data of disparate data types. Such data sources may be any device or network location capable of providing access to data of a disparate data type. Examples of disparate data sources include servers serving up files, web sites, cellular phones, PDAs, MP3 players, and so on as will occur to those of skill in the art.

The data processing system of FIG. 1 includes a wide area network ("WAN") (116) including a number of disparate data sources (228) operating as disparate data sources and a consolidated content management server (114) for consolidated content management according to the present invention. The exemplary system of FIG. 1 includes a media server (230) providing content in the form of media files such as, for example, MP3 files. The exemplary system of FIG. 1 includes an IBM On Demand Workstation (232) a server providing support for an On Demand Workplace ('ODW') that provides productivity tools, and a virtual space to share ideas and expertise, collaborate with others, and find information.

The exemplary system of FIG. 1 includes an RSS server (234) providing content through RSS feeds. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This content is typically delivered as an XML file called RSS feed, webfeed, RSS stream, or RSS channel.

The system of FIG. 1 includes a calendar data server (236) that maintains calendar data for a user. The system of FIG. 1 also includes an email server (238).

The system of FIG. 1 includes a consolidated content management server (114). The consolidated content management server (114) provides consolidated content management of content from the disparate data sources (228) for delivery to one or more rendering devices (104, 108, 110, and 112). The consolidated content management server (114) is capable generally of aggregating, for a user, content of disparate data types from disparate data sources; synthesizing the aggregated content of disparate data types into synthesized content including data of a uniform data type for delivery to a particular rendering device (104, 108, 110, and 112); receiving from the rendering device (104, 108, 110, and 112) a request for the synthesized content; and transmitting, in a response to the request, the requested synthesized content to the rendering device (104, 108, 110, and 112).

The system of FIG. 1 includes a number of rendering devices (104, 108, 110, and 112) connected to a WAN (102). The rendering devices of FIG. 1 include a digital audio player ('DAP') (104) capable of playing MP3 files. An example of such a DAP is an iPod currently available from Apple. The rendering devices of FIG. 1 include smart phone (108) capable of rendering content in wireless markup language ('WML') and a personal digital assistant ('PDA') (112) capable of rendering content in the hypertext transfer markup language ('HTML').

The rendering devices of FIG. 1 also include a laptop computer (110) capable of supporting a multimodal browser for rendering content in XHTML plus Voice. XHTML plus Voice ('X+V') is a Web markup language for developing multimodal applications, by enabling voice in a presentation layer with voice markup. X+V provides voice-based interaction in small and mobile devices using both voice and visual elements. X+V is composed of three main standards: XHTML, VoiceXML, and XML Events. Given that the Web application environment is event-driven, X+V incorporates the Document Object Model (DOM) eventing framework used in the XML Events standard. Using this framework, X+V defines the familiar event types from HTML to create the correlation between visual and voice markup.

Each of rendering devices is capable of requesting from the consolidated content management server (114) content that has been aggregated from the disparate data sources and synthesized into content of a uniform data type. The consolidated content management server transmits in response to the request the content in a data type specific to the rendering device thereby allowing the rendering device to render the content regardless of the native data type of content as provided by the original content provider.

Consider for example, email content provided by the email server (238). The consolidated content management server (114) is capable of aggregating for a user email content and synthesizing the email by extracting the email text and inserting the email text into a header field of an MP3 file. The consolidated content management server (114) transmits the MP3 file to the DAP (104) that supports the display of information extracted from header fields. In this example of consolidated content management, the DAP (104) is capable of rendering in its display email despite being only able to render media files and without requiring modification of the DAP.

Consolidated content management of the present invention advantageously provides a single point of access to a wide variety of content to a user and wide flexibility in the manner and upon which device that content is rendered.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
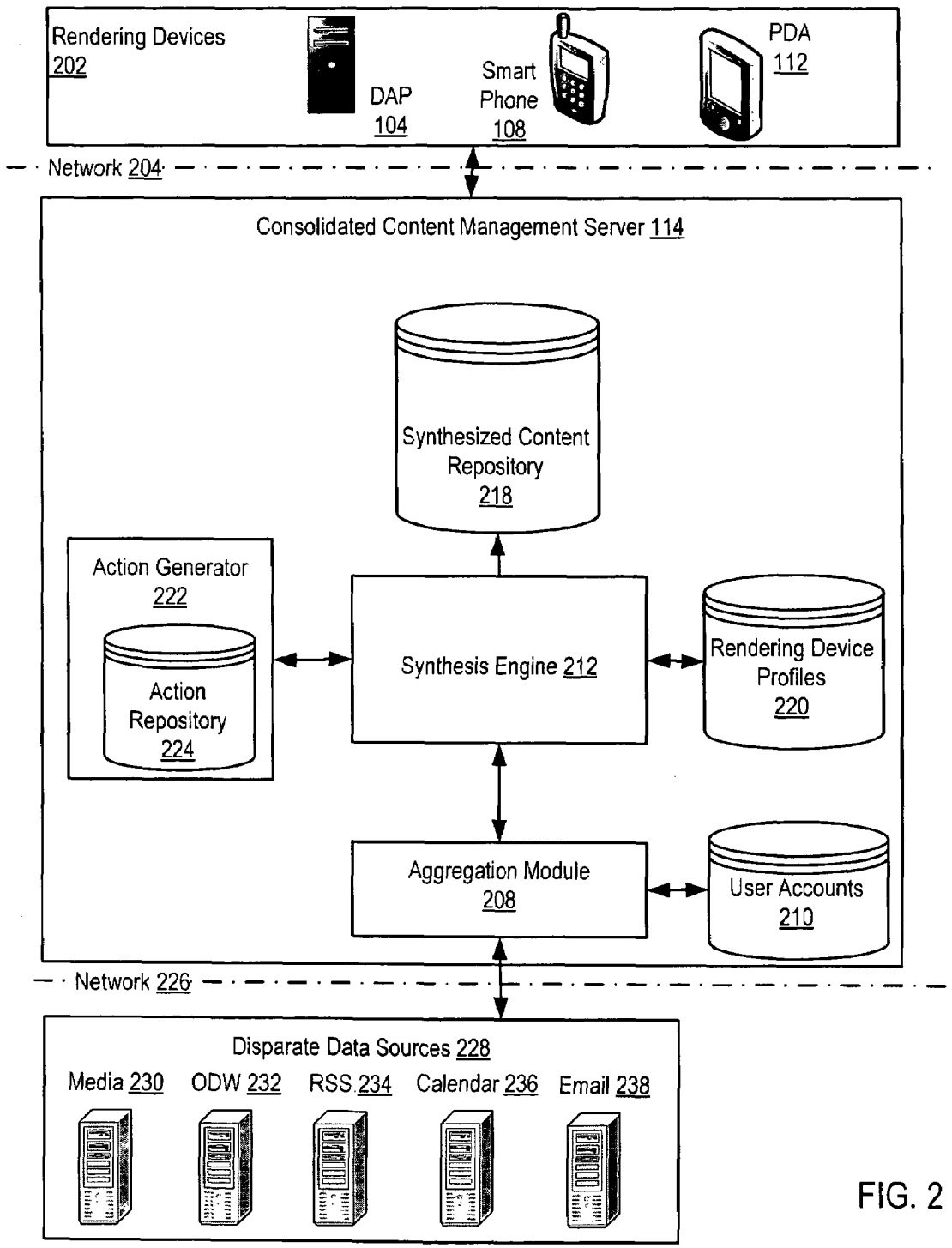
FIG. 2 sets forth a block diagram depicting a system for consolidated content management for delivery to a rendering device according to of the present invention.

For further explanation, FIG. 2 sets forth a block diagram depicting a system for consolidated content management for delivery to a rendering device according to of the present invention. The system of FIG. 2 includes a plurality of rendering devices (202) for rendering synthesized content provided by the consolidated content management server (114) aggregated from a plurality of disparate data sources (228). The consolidated content management server (114) is capable generally of aggregating, for a user, content of disparate data types from disparate data sources, (230, 232), 234, 236, and 238), (228); synthesizing the aggregated content of disparate data types into synthesized content including data of a particular data type for delivery to a particular rendering device (104, 108, or 112); receiving from the rendering device (104, 108, or 112) a request for the synthesized content; and transmitting, in a response to the request, the requested synthesized content to the rendering device (202).

The consolidated content management server (114) of FIG. 2 includes an aggregation module (208). The aggregation module (208) of FIG. 1 is implemented as computer program instructions for aggregating data of disparate data types from disparate data sources. The exemplary aggregation module (208) is capable generally of aggregating, for a user, content of disparate data types from disparate data sources by establishing a user account for the user; retrieving content of disparate data types from identified disparate data sources associated with the user account; storing the retrieved content; and associating the stored content with the user account as discussed in more detail below with reference to FIGS. 7-10.

The consolidated content management server (114) of FIG. 2 includes a synthesis engine (212). The synthesis engine of FIG. 1 is implemented as computer program instructions for synthesizing aggregated content of disparate data types into synthesized content including data of a uniform data type for delivery to a particular rendering device. The exemplary synthesis engine (212) is capable generally of synthesizing aggregated content of disparate data types into synthesized content including data of a uniform data type for delivery to a particular rendering device by identifying at least a portion of the aggregated content for delivery to the particular data rendering device; and translating the portion of the aggregated content into text content and markup associated with the text content in accordance with device profiles (220) for the rendering device as discussed in more detail below with reference to FIG. 11-14. The exemplary synthesis engine (212) is also capable generally of synthesizing aggregated content of disparate data types into synthesized content including data of a uniform data type for delivery to a particular rendering device by creating text in dependence upon the portion of the aggregated content; creating a media file for the synthesized content; and inserting the text in the header of the media file as discussed in more detail below with reference to FIG. 15.

The consolidated content management server (114) includes repository (218) of synthesized content. Maintaining a repository (218) of synthesized content provides a single point of access at the consolidated content management server for content aggregated from various disparate data sources (228) for rendering on a plurality of disparate rendering devices (104, 108, and 112). Because the content has been synthesized for delivery to the particular rendering devices (104, 108, and 112) the content may be rendered in a data format that the rendering devices support regardless of the original native data type of the content as served up by the disparate data sources (228).

Alternatively, content may be synthesized for delivery to a particular rendering device upon request for the synthesized data from a particular rendering device. Synthesizing data upon request for the data by a particular rendering device reduces the overhead of maintaining large repositories of synthesized content for a particular user and for delivery to a particular device.

The consolidated content management serer (114) also includes an action generator (222) containing a repository of actions (224). Synthesized content often has associated with it actions for execution on the rendering device. For example, content synthesized as X+V documents include grammars and actions providing voice navigation of the content thereby empowering a user to use speech to instruct the rendering of the content on the multimodal browser of a rendering device.

Consolidated content management in accordance with the present invention is generally implemented with computers, that is, with automated computing machinery. In the systems of FIGS. 1 and 2, for example, all the nodes, servers, and communications devices are implemented to some extent at least as computers. For further explanation, therefore, FIG. 3 sets forth a block diagram of automated computing machinery comprising an exemplary consolidated content management server (114) useful in consolidated content management for delivery to a rendering device according to embodiments of the present invention. The consolidated content management server (114) of FIG. 3 includes at least one computer processor (156) or 'CPU' as well as random access memory (168) ('RAM') which is connected through a system bus (160) to a processor (156) and to other components of the consolidated content management server (114).

Stored in RAM (168) is an exemplary consolidated content management module (140), computer program instructions for consolidated content management for delivery to a rendering device capable of aggregating, for a user, content of disparate data types from disparate data sources; synthesizing the aggregated content of disparate data types into synthesized content of a data type for delivery to a particular rendering device; receiving from the rendering device a request for the synthesized content; and transmitting, in a response to the request, the requested synthesized content to the rendering device.

The consolidated content management module (140) of FIG. 2 includes an aggregation module (208) computer program instructions for aggregating data of disparate data types from disparate data sources. The exemplary aggregation module (208) is capable generally of aggregating, for a user, content of disparate data types from disparate data sources by establishing a user account for the user; retrieving content of disparate data types from identified disparate data sources associated with the user account; storing the retrieved content; and associating the stored content with the user account as discussed in more detail below with reference to FIGS. 7-10.

The consolidated content management module (140) of FIG. 2 includes a synthesis engine (212) computer program instructions for synthesizing aggregated content of disparate data types into synthesized content including data of a uniform data type for delivery to a particular rendering device. The exemplary synthesis engine (212) is capable generally of synthesizing aggregated content of disparate data types into synthesized content including data of a uniform data type for delivery to a particular rendering device by identifying at least a portion of the aggregated content for delivery to the particular data rendering device; and translating the portion of the aggregated content into text content and markup associated with the text content in accordance with device profiles for the rendering device as discussed in more detail below with reference to FIG. 11-14. The exemplary synthesis engine (212) is also capable generally of synthesizing aggregated content of disparate data types into synthesized content including data of a uniform data type for delivery to a particular rendering device by creating text in dependence upon the portion of the aggregated content; creating a media file for the synthesized content; and inserting the text in the header of the media file as discussed in more detail below with reference to FIG. 15.

Figure 3:
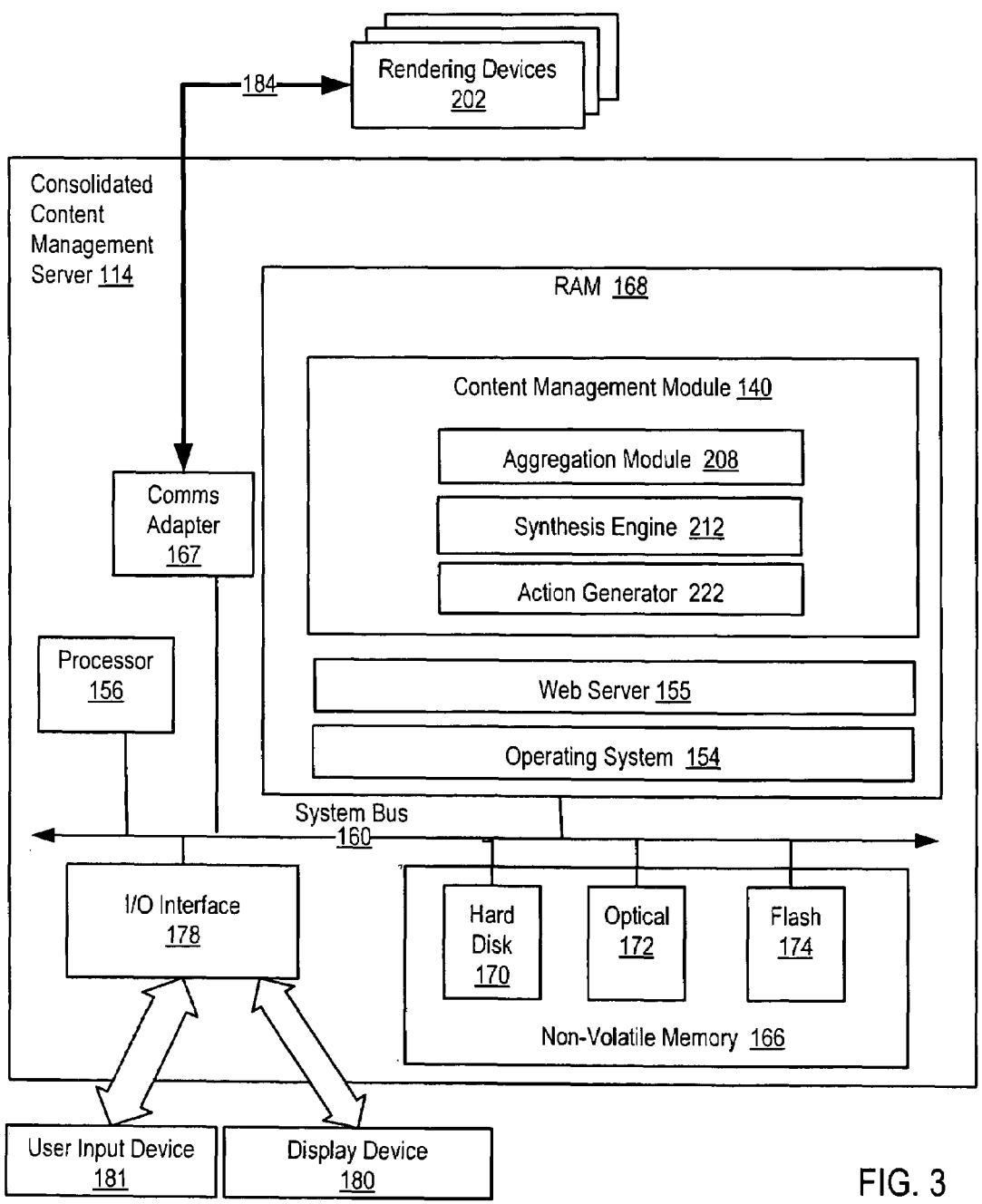
FIG. 3 sets forth a block diagram of automated computing machinery comprising an exemplary consolidated content management server useful in consolidated content management for delivery to a rendering device according to embodiments of the present invention.

The consolidated content management module (140) of FIG. 3 includes an action generator (222) computer program instructions for generating actions associated with synthesized content. Such actions are often executed on a rendering device to whom the synthesized content is transmitted.

The exemplary consolidated content management server (114) of FIG. 3 also includes a web server (155). Consolidated content management server may usefully provide synthesized content though the use of programs that run on a web server and build web pages, such as for example, servlets. Such programs may build dynamic server pages such as for example Java Server Pages ('JSP') containing synthesized content for delivery to a particular rendering device. On such web server useful in consolidated content management according to the present invention is the WebSphere® Application Server available from IBM. WebSphere Application Server is a Java™-based application platform, integrating enterprise data and transactions for the dynamic e-business. WebSphere Application Server delivers a rich application deployment environment with application services that provide transaction management, security, performance, availability, connectivity, and scalability.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art.

The exemplary consolidated content management server (114) of FIG. 3 includes non-volatile computer memory (166) coupled through a system bus (160) to a processor (156) and to other components of the consolidated content management server (114). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The exemplary consolidated content management server (114) of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary consolidated content management server (114) of FIG. 3 includes a communications adapter (167) for implementing data communications (184) with rendering devices (202). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for consolidated content management include modems for wired dial-up communications, Ethernet (IEEE 802.3) adapters for wired network communications, and 802.11b adapters for wireless network communications and other as will occur to those of skill in the art.

Consolidated Content Management for Delivery to a Rendering Device

Consolidated content management of the present invention advantageously provides a single point of access to a wide variety of content to a user and wide flexibility in the manner and upon which device that content is rendered. For further explanation, FIG. 4 sets forth a flow chart illustrating an exemplary computer-implemented method for consolidated content management for delivery to a rendering device. The method of FIG. 4 includes aggregating (402), for a user, content (404) of disparate data types from disparate data sources (228). Aggregated data is the accumulation, in a single location, of data of disparate types. The location of the aggregated data may be either physical, such as, for example, on a single computer containing aggregated data, or logical, such as, for example, a single interface providing access to the aggregated data.

Figure 4:
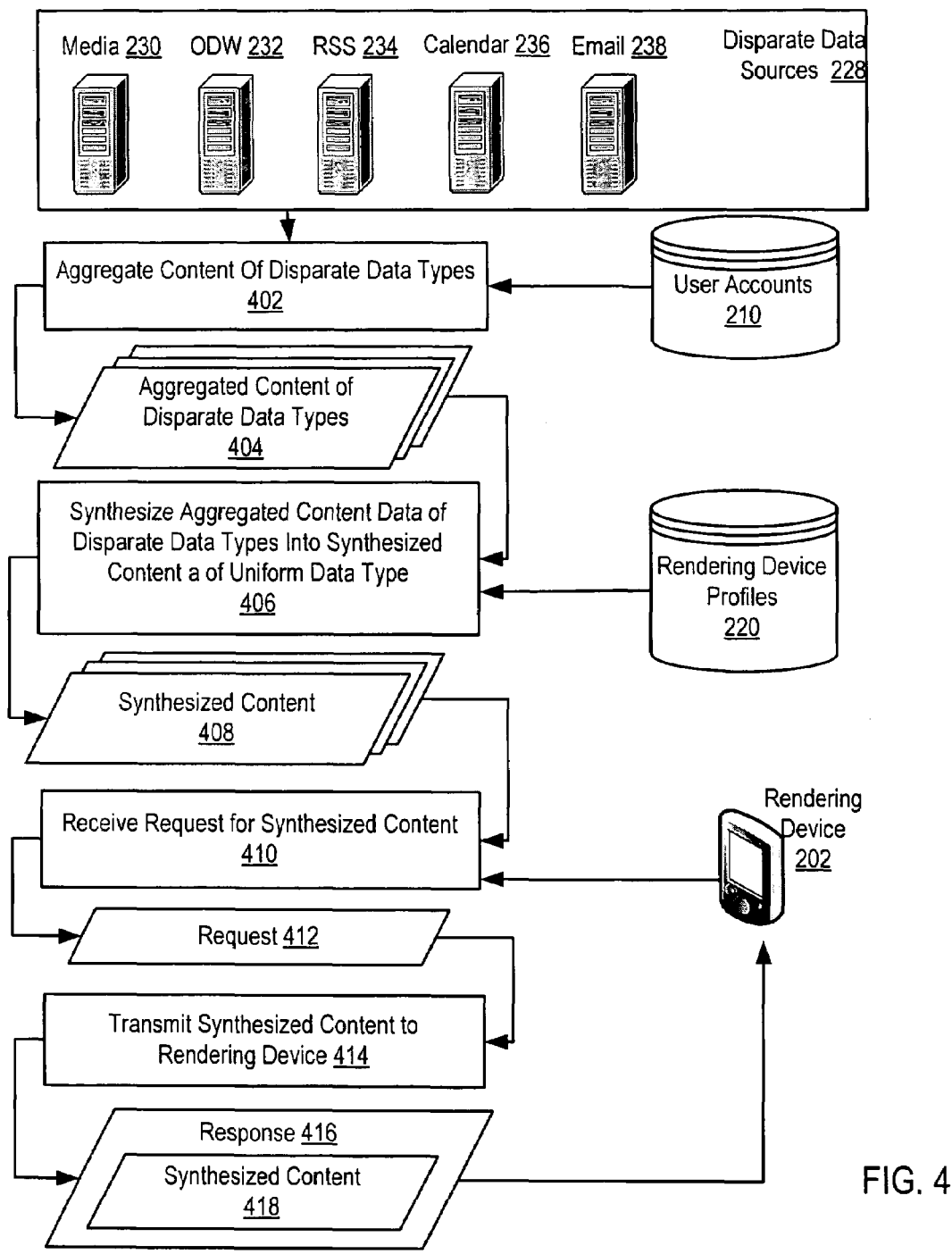
FIG. 4 sets forth a flow chart illustrating an exemplary computer-implemented method for consolidated content management for delivery to a rendering device.

Aggregating (402), for a user, content (404) of disparate data types from disparate data sources (228) according to the method of FIG. 4 is carried out in dependence upon user accounts (210) established for a user that contain identifications of user selected data sources for aggregation and identifications of one or more rendering devices upon which synthesized content is to be rendered. Aggregating, for a user, content of disparate data types from disparate data sources may be carried out by establishing a user account for the user; retrieving content of disparate data types from identified disparate data sources associated with the user account; storing the retrieved content; and associating the stored content with the user account as discussed in more detail below with reference to FIGS. 7-10.

The method of FIG. 4 also includes synthesizing (406) the aggregated content (404) of disparate data types into synthesized content (408) including data of a uniform data type for delivery to a particular rendering device (202). Synthesized content is content derived from aggregated data which has been synthesized for rendering upon a particular rendering device. That is, the content of the aggregated data is synthesized into data of a data type that a particular rendering device supports.

Synthesizing aggregated content of disparate data types into synthesized content including data of a uniform data type for delivery to a particular rendering device is typically carried out in dependence upon device profiles (220) identifying attributes of the particular rendering device such as file formats the device supports, markup languages the devices supports, data communications protocols the device supports, and other attributes as will occur to those of skill in the art. Synthesizing aggregated content of disparate data types into synthesized content including data of a uniform data type for delivery to a particular rendering device may be carried out by identifying at least a portion of the aggregated content for delivery to the particular data rendering device; and translating the portion of the aggregated content into text content and markup associated with the text content in accordance with device profiles for the rendering device as discussed in more detail below with reference to FIG. 11-14.

Synthesizing the aggregated content of disparate data types into synthesized content including data of a uniform data type for delivery to a particular rendering device may also be carried out by creating text in dependence upon the portion of the aggregated content; creating a media file for the synthesized content; and inserting the text in the header of the media file as discussed in more detail below with reference to FIG. 15.

Figure 5:
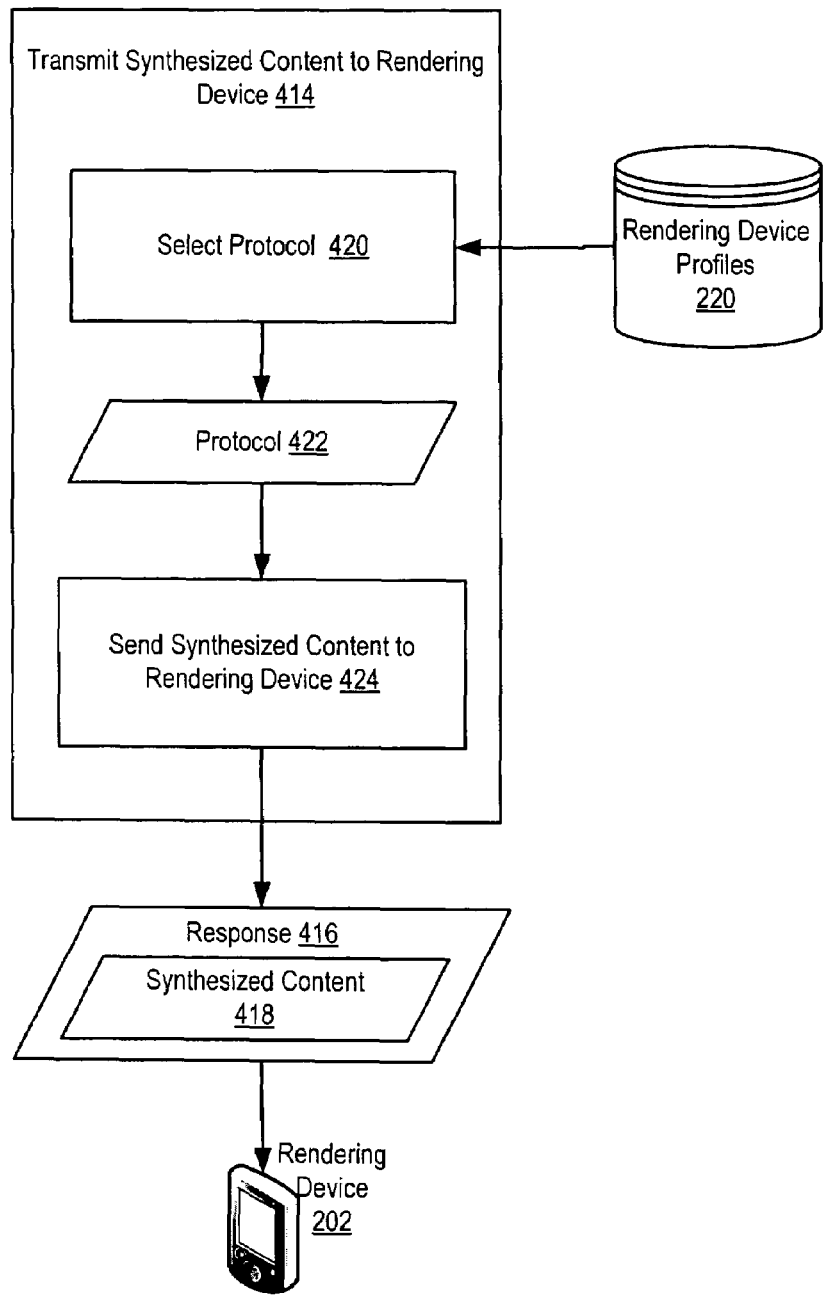
FIG. 5 sets forth a flow chart illustrating an exemplary method for transmitting requested synthesized content to a rendering device.

The method of FIG. 4 also includes receiving (410) from the rendering device (202) a request (412) for the synthesized content (408) and transmitting (414), in a response (416) to the request (412), the requested synthesized content (418) to the rendering device (202). For further explanation, FIG. 5 sets forth a flow chart illustrating an exemplary method for transmitting (414), in a response (416) to the request, the requested synthesized content (418) to the rendering device (202). Transmitting (414), in a response (416) to the request, the requested synthesized content (418) to the rendering device (202) according to the method of FIG. 5 includes selecting (420) a protocol (422) for transmission to the rendering device (202) in dependence upon a device profile (220)

of the rendering device (202) and sending (424) the synthesized content (418) to the rendering device (202) in accordance with the protocol (422). Protocols useful in transmitting synthesized content to rendering devices in the Hypertext Transfer Protocol ('HTTP'), Wireless Access Protocol ('WAP'), Handheld Device Transport Protocol (HDTP') and many other as will occur to those of skill in the art.

As discussed above, synthesized content often has associated with it actions for execution on the rendering device. For example, content synthesized as X+V documents include grammars and actions providing voice navigation of the content thereby empowering a user to use speech to instruct the rendering of the content on the multimodal browser of a rendering device. For further explanation, FIG. 6 sets forth a flow chart illustrating additional aspects of consolidated content management for delivery according to the present invention. The method of FIG. 6 includes identifying (426) a rendering action (428) for execution by the rendering device (202). An rendering action is a set of computer instructions that when executed carry out a predefined task for rendering the synthesized content on the rendering device (202). The rendering action may be executed in dependence upon the synthesized data immediately or at some defined later time. Identifying (426) a rendering action (428) may be carried out by receiving a user instruction, selecting synthesized content in response to the user instruction, and selecting particular rendering method for rendering the synthesized content.

A user instruction is an event received in response to an act by a user. Exemplary user instructions include receiving events as a result of a user entering a combination of keystrokes using a keyboard or keypad, receiving speech from a user, receiving an event as a result of clicking on icons on a visual display by using a mouse, receiving an event as a result of a user pressing an icon on a touchpad, or other user instructions as will occur to those of skill in the art. Receiving a speech instruction from a user may be carried out by receiving speech from a user, converting the speech to text, and determining in dependence upon the text and a grammar associated with the synthesized content the user instruction.

Figure 6:
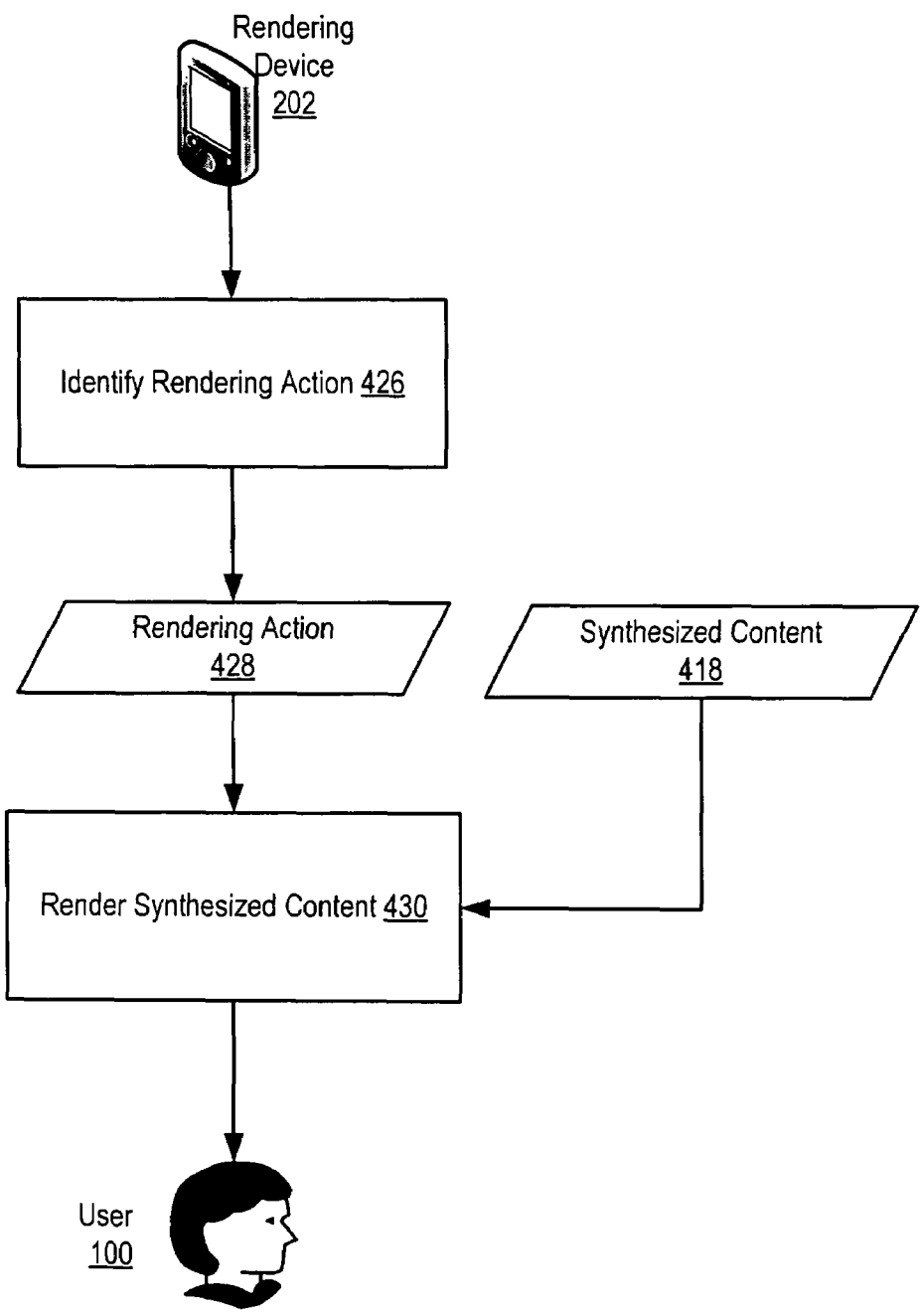
FIG. 6 sets forth a flow chart illustrating additional aspects of consolidated content management for delivery according to the present invention.

The method of FIG. 6 also includes rendering (430) the synthesized content (418), by the rendering device (202), in accordance with the rendering action (426). Rendering (430) the synthesized content (418), by the rendering device (202), in accordance with the rendering action (426) result in presenting to the user (100) the synthesize content using the facilities supported by the rendering device. Consider for example, email content synthesized by extracting the text from an email and inserting the text in the header of a media file for transmission to a digital audio player. Such a player includes a display function that displays text in the header of a media file which is often used to display metadata about a media file such as the name and artist of a song. Synthesizing the content of the email by including the text of the email in the header of a media file advantageously allows email to be rendered on the digital audio player without modification of the player itself.

In the examples above, synthesizing the aggregated content of disparate data types into synthesized content including data of a uniform data type for delivery to a particular rendering device is carried out by synthesizing the aggregated content of disparate data types into synthesized content including data of a uniform data type for delivery to a particular rendering device prior to receiving from the rendering device the request for the synthesized content. That is, content is synthesized for particular devices and stored such that the content is available to those particular devices. This is for explanation, and not for limitation. In fact, alternatively synthesizing the aggregated content of disparate data types into synthesized content for delivery to a particular rendering device may also be carried out by synthesizing the aggregated content of disparate data types into synthesized content including data of a uniform data type for delivery to a particular rendering device in response to receiving from the rendering device the request for the synthesized content.

Aggregating Content of Disparate Data Types from Disparate Data Sources for Single Point Access by a User As discussed above, consolidated content management typically includes aggregating for a user, content of disparate data types from disparate data sources. For further explanation, therefore, FIG. 7 sets forth a flow chart illustrating an exemplary computer implemented method for aggregating content of disparate data types from disparate data sources for single point access by a user. The method of FIG. 7 includes establishing (502) a user account (210) for the user (100). A user account (210) typically associates with a user a plurality of identified data sources, one or more rendering devices for rendering synthesized content, and various user preferences for both synthesizing content and rendering the content.

Figure 7:
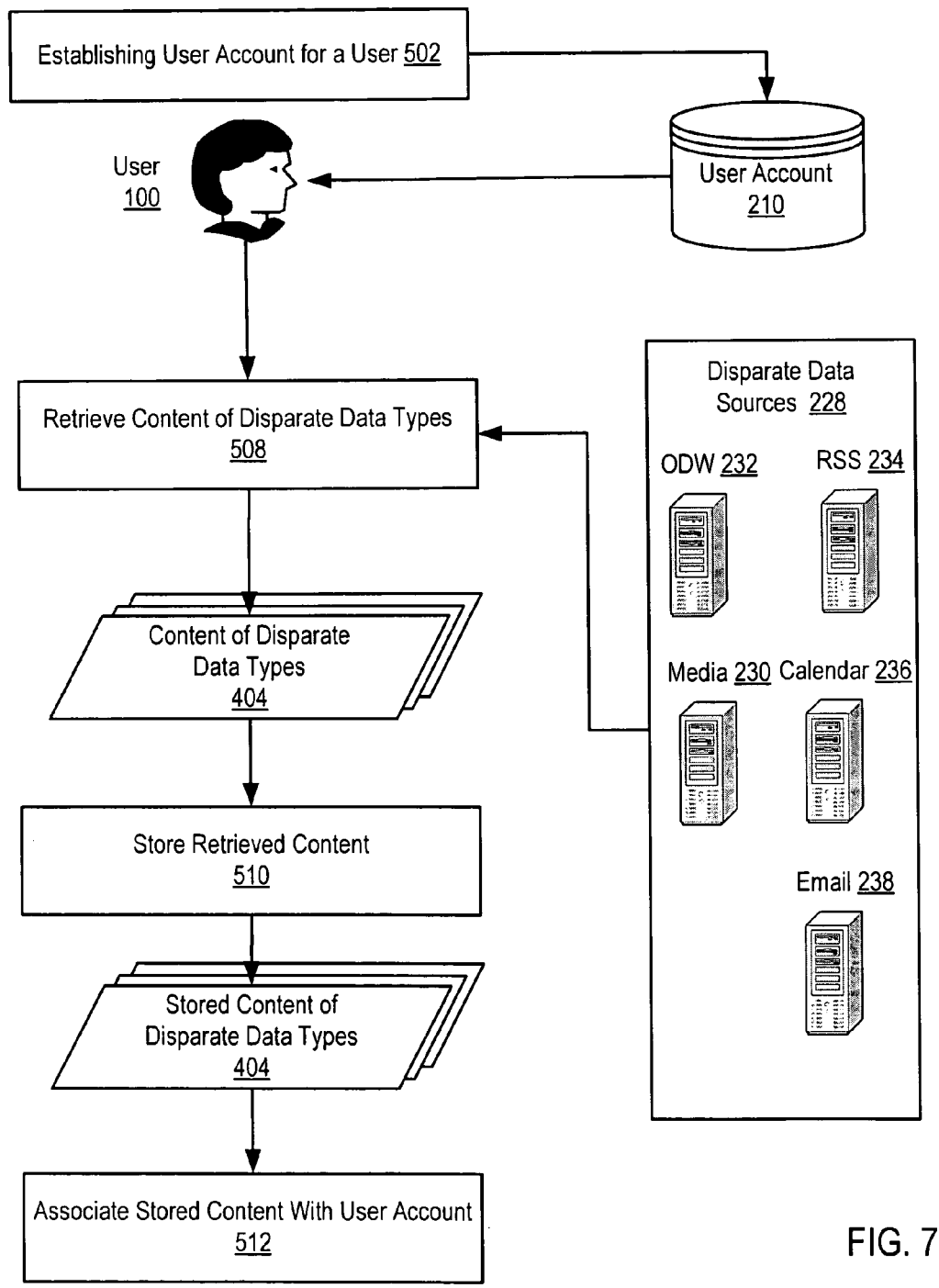
FIG. 7 sets forth a flow chart illustrating an exemplary computer implemented method for aggregating content of disparate data types from disparate data sources for single point access by a user.

The method of FIG. 7 also includes retrieving (508) content (404) of disparate data types from identified disparate data sources (228) associated with the user account (210). Retrieving (508) content (404) of disparate data types from identified disparate data sources (228) associated with the user account (210) may be carried out by retrieving the data from memory locally, downloading the data from a network location, or any other way of retrieving the requested data that will occur to those of skill in the art.

Some data sources may require security information for accessing data. Retrieving (508) content (404) of disparate data types from identified disparate data sources (228) associated with the user account (210) may therefore also include determining whether the identified data source requires security information to access the content and retrieving security information for the data source from the user account if the identified data source requires security information to access the content and presenting the security information to the data source to access the content.

The method of FIG. 7 also includes storing (510) the retrieved content (404) and associating (512) the stored content with the user account (210). The stored content is typically maintained in memory available to a consolidated content management server.

As discussed above, aggregating content is typically carried out in dependence upon a user account. For further explanation, therefore, FIG. 8 sets forth a flow chart illustrating an exemplary method for establishing a user account (210) for the user (100). The method of FIG. 8 includes receiving (504), from the user (100), identifications (506) of a plurality of disparate data sources (228). Identifications (506) of a plurality of disparate data sources (228) may include pathnames, network locations, universal resource locators ('URLs') uniquely identifying the data sources, or any other identifications of data sources that will occur to those of skill in the art.

Receiving (504), from the user (100), identifications (506) of a plurality of disparate data sources (228) may be carried out through the use of user account configuration screens provided by a consolidated content management server and accessible by a user though for example a browser running on a rendering device. Such configuration screens provide a vehicle for efficiently associating with a user account a plurality of disparate data sources.

Figure 8:
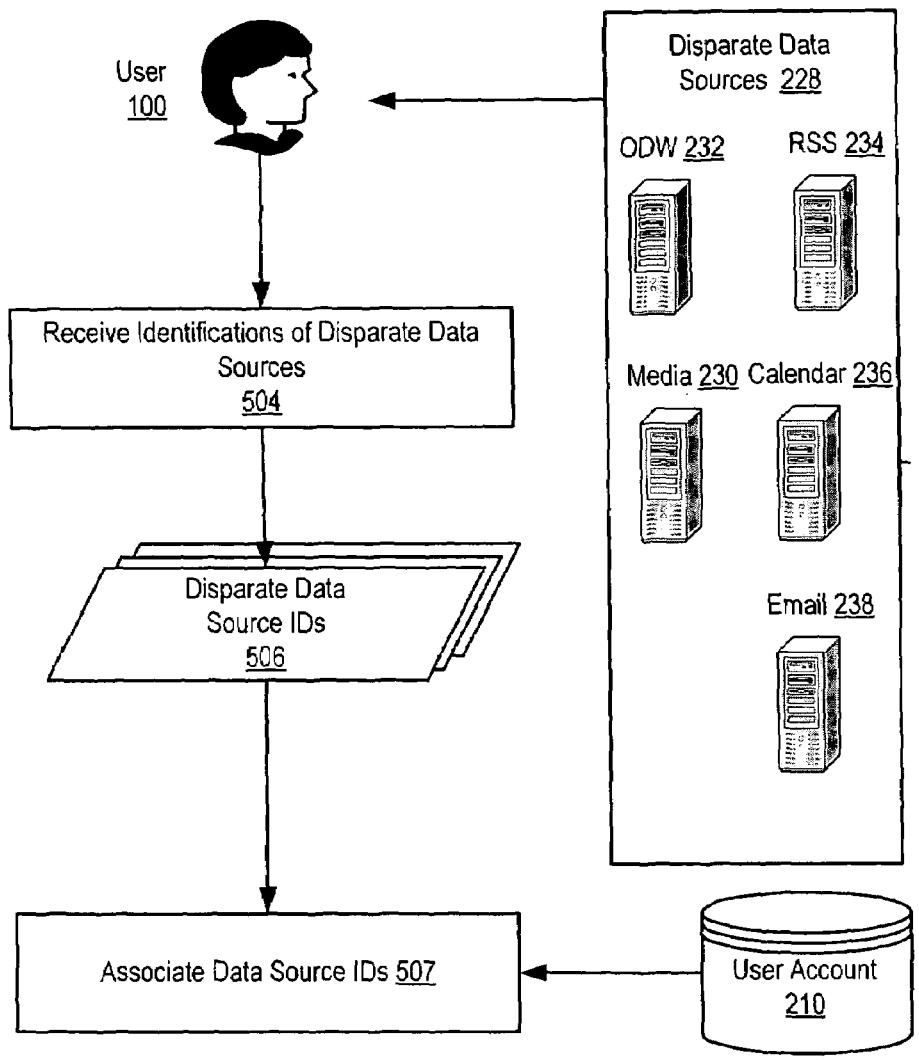
FIG. 8 sets forth a flow chart illustrating an exemplary method for establishing a user account.

The method of FIG. 8 also includes associating (507) the identifications (506) with the user account (210). Associating (507) the identifications (506) with the user account (210) may be carried out by storing the identifications in a user record for the user in association with a user ID uniquely identifying the user.

As discussed above, aggregating content is typically carried out in dependence upon a user account. For further explanation, FIG. 9 sets forth a flow chart illustrating an exemplary method for establishing a user account (210) for the user (100). The method of FIG. 9 includes receiving (514), from a user, identifications (516) of one or more rendering devices (104, 106, and 112). Identifications of rendering devices may include make and model of the rendering device, unique serial numbers of the rendering devices or any other identification of a rendering device that will occur to those of skill in the art.

Receiving (514), from a user, identifications (516) of one or more rendering devices (104, 106, and 112) may be carried out through the use of user account configuration screens provided by a consolidated content management server and accessible by a user though for example a browser running on a rendering device. Such configuration screens provide a vehicle for efficiently associating with a user account one or more rendering devices.

Figure 9:
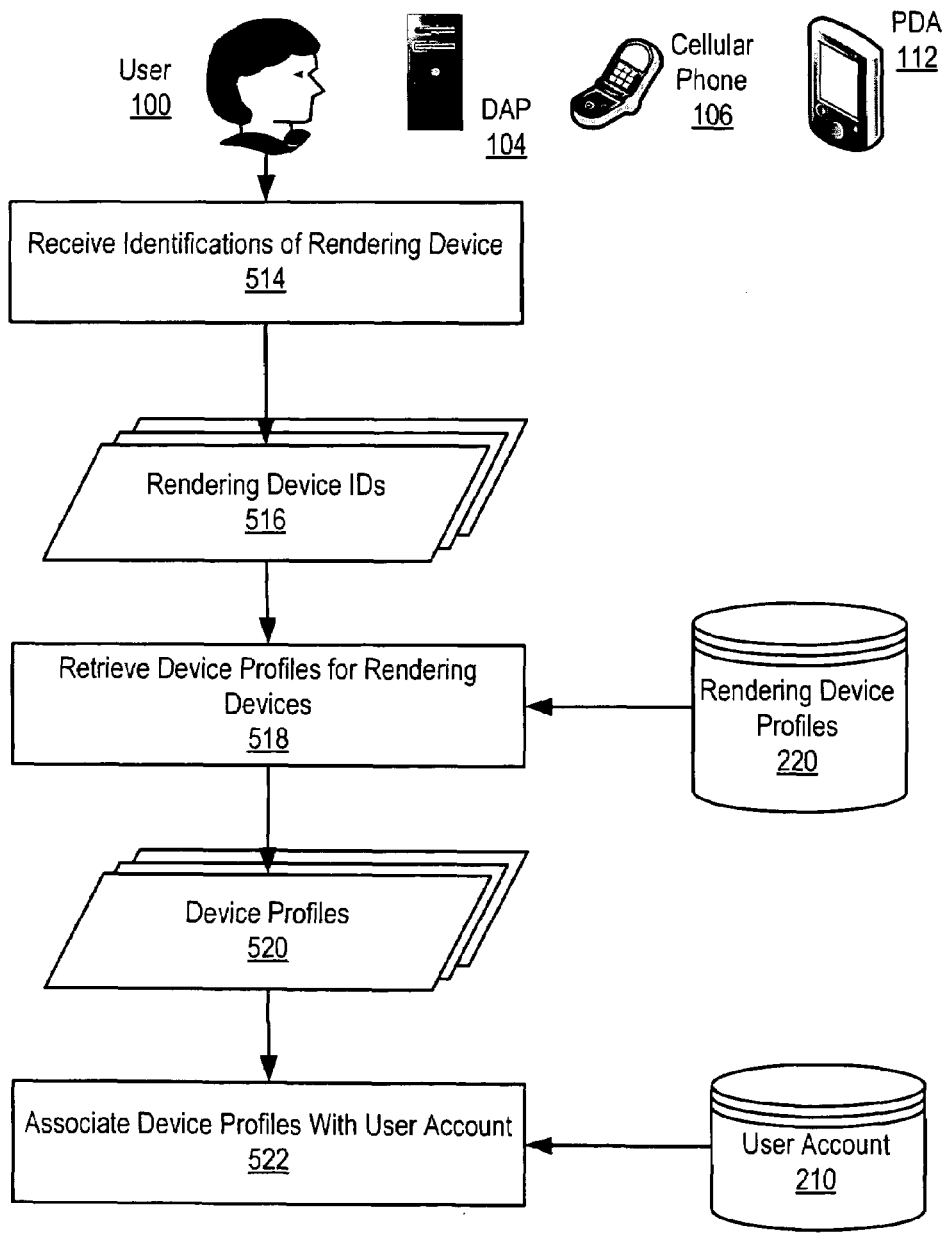
FIG. 9 sets forth a flow chart illustrating an exemplary method for establishing a user account for the user.

The method of FIG. 9 also includes retrieving (518) device profiles (520) for the one or more rendering devices (104, 106, and 112) in dependence upon the identifications (516) and associating (522) the retrieved device profiles (520) with the user account (210). Device profiles (520) for the one or more rendering devices typically identify attributes of the rendering device useful in synthesizing content for rendering on the device and for transmitting the synthesized content to the rendering device. Examples of such attributes in devices profiles include markup languages supported by the device, file types supported by the device, applications capable of being run on the device, communication protocols supported by the device and so on as will occur to those of skill in the art.

Figure 10:
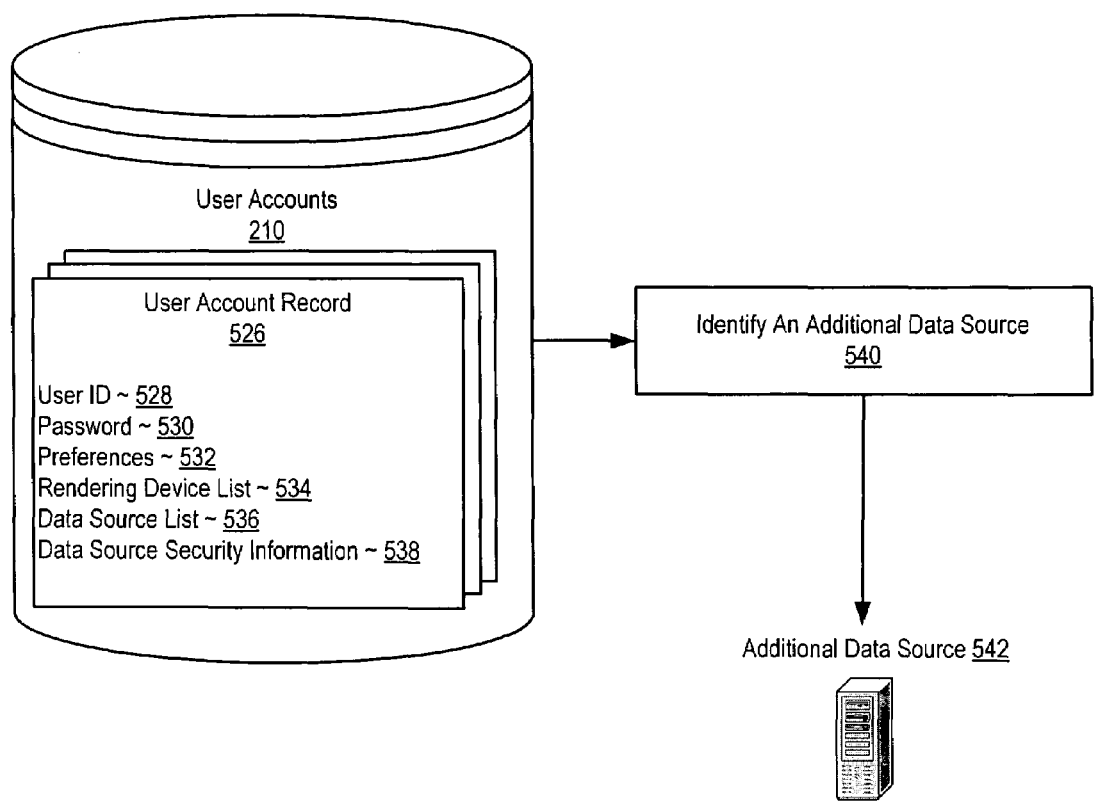
FIG. 10 sets forth block diagram of exemplary user accounts containing a plurality of user account records.

For further explanation, FIG. 10 sets forth block diagram of exemplary user accounts (210) containing a plurality of user account records (526). The exemplary user account records (526) include a user ID (528) uniquely identifying the user and a password (530) for authentication of the user in accessing the user account.

The exemplary user account records (526) include user preferences (532) for synthesizing and rendering the synthesized content for the user. Examples of such user preferences include display preferences, such as font and color preferences, layout preferences, and so on as will occur to those of skill in the art.

The exemplary user account records (526) include a rendering device list (534) including one or more identifications of rendering devices. The exemplary user account records (526) also includes data source list (536) including one or more identifications of disparate data sources and data source security information (538) including any security information required to retrieve content from the identified data source.

The information in use accounts (210) may be used to identify additional data sources without requiring additional user intervention. FIG. 10 therefore also illustrates identifying (540) an additional data source (542) in dependence upon information in the user account. Identifying (540) an additional data source in dependence upon information in the user account information may include identifying an additional data source in dependence upon data sources identified by the user, rendering devices identified by the user, user accounts for one or more other users, data sources identified by one or more other users, and other information in user accounts as will occur to those of skill in the art.

Identifying (540) an additional data source in dependence upon information in the user account information may be carried out by creating a search engine query in dependence upon the information in the user account and querying a search engine with the created query. Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. An example of URL encoded data is:

http://www.example.com/
  search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

Identifying (540) an additional data source in dependence upon information in the user account information may also include identifying, from the search results returned in the created query, additional sources of data. Such additional sources of data may be identified from the search results by retrieving URLs to data sources from hyperlinks in a search results page returned by the search engine.

Synthesized Content for Single Point Access by a User

As discussed above, consolidated content management provides single point access for content and typically includes synthesizing content of disparate data types into synthesized content of a uniform data type for delivery to a particular rendering device. For further explanation, FIG. 11 sets forth flow chart illustrating an exemplary method for synthesizing content of disparate data types into synthesized content including data of a uniform data type for single point access by a user. The method of FIG. 11 includes identifying (602) aggregated content (404) of disparate data types. Identifying (602) aggregated content (404) of disparate data types for synthesis may be carried out by identifying content stored in association with a user account and aggregated for a user.

Identifying (602) aggregated content (404) of disparate data types typically for synthesis may also be carried out in dependence upon a user instruction. That is, identifying (602) aggregated content (404) of disparate data types for synthesis may include receiving a user instruction identifying aggregated content for synthesis and selecting for synthesis the content identified in the user instruction.

Figure 11:
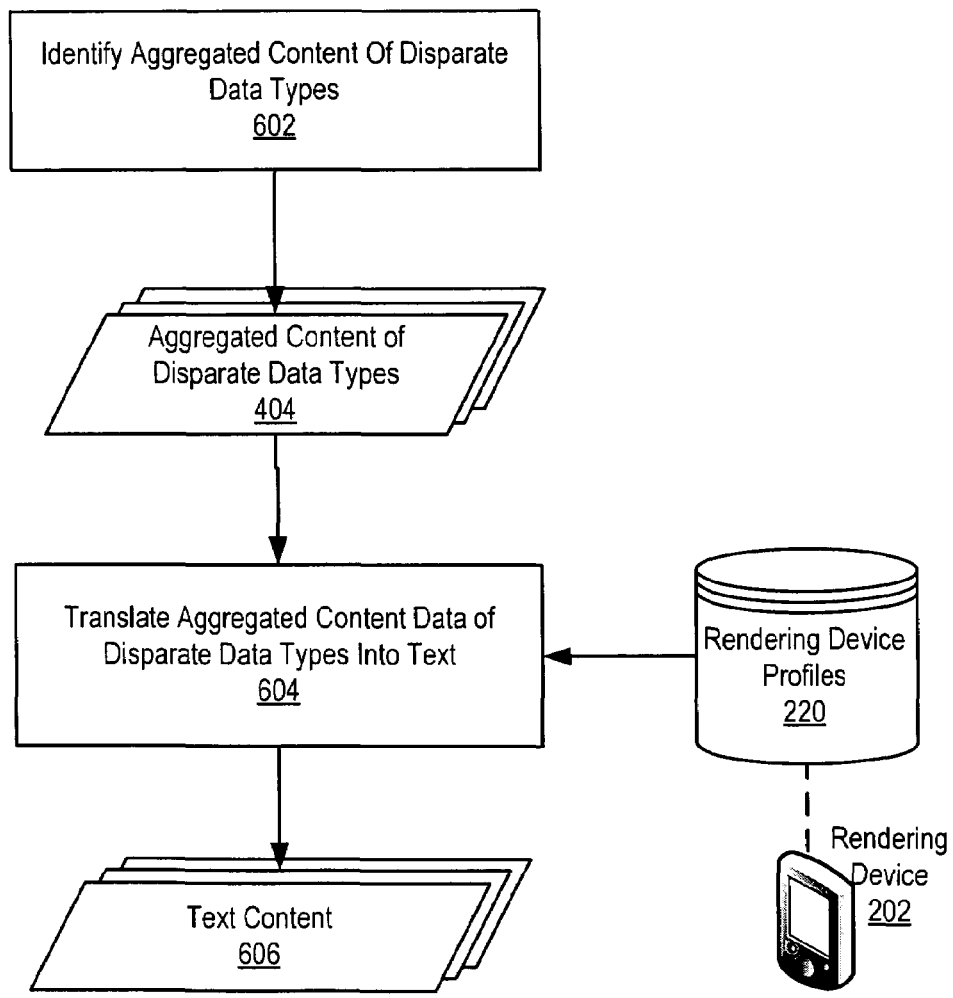
FIG. 11 sets forth flow chart illustrating an exemplary method for synthesizing content of disparate data types into synthesized content including data of a uniform data type for single point access by a user.

The method of FIG. 11 also includes translating (604) the aggregated content (404) into text content (606) in accordance with device profiles (220) for an identified rendering device (202). Translating the aggregated content into text content in accordance with device profiles for an identified rendering device may be carried out by identifying a markup language supported by the rendering device and creating text and markup for the aggregated content in accordance with the identified markup language as discussed below with reference to FIGS. 12 and 13. Translating (604) the aggregated content (404) into text content in accordance with device profiles (220) for an identified rendering (202) device may also be carried out by creating text in dependence upon the aggregated content; creating a media file for the text content; and inserting the text in the media file as discussed below with reference to FIG. 15.

As discussed above, translating into text content may include creating text and markup for the aggregated content in accordance with an identified markup language. For further explanation, therefore, FIG. 12 sets forth a flow chart illustrating an exemplary method for translating the aggregated content into text content in accordance with device profiles for an identified rendering device that includes identifying (608) a markup language (610) supported by the rendering device (202). Identifying (608) a markup language (610) supported by the rendering device (202) may be carried out by retrieving a rendering device profile (220) for the rendering device and selecting a markup language supported by the rendering device from the selected device profile. Examples of markup languages useful in synthesizing aggregated content include X+V, Wireless Markup Language ('WML'), eXtensible Markup Language ('XML'), hypertext transfer markup language ('HTML') and others as will occur to those of skill in the art.

Figure 12:
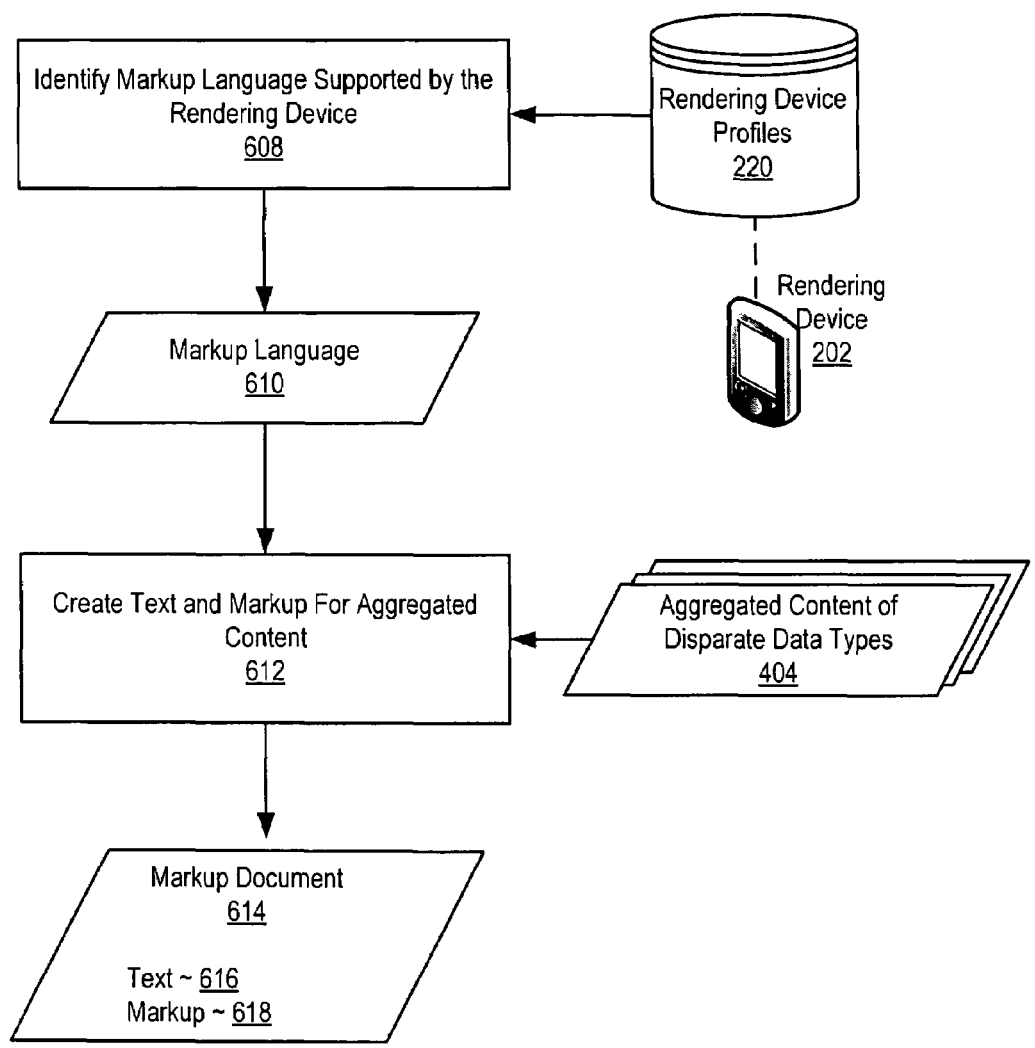
FIG. 12 sets forth a flow chart illustrating an exemplary method for translating the aggregated content into text content in accordance with device profiles for an identified rendering device.

The method of FIG. 12 also includes creating (612) text (616) and markup (618) for the aggregated content (404) in accordance with the identified markup language (610). In the example of FIG. 12, the text (616) and markup (618) make up a markup document (614). Creating (612) text (616) and markup (618) for the aggregated content (404) in accordance with the identified markup language (610) includes representing in text and markup the aggregated content such that a browser supporting the selected markup language capable of rendering some or all of the content contained in the aggregated data prior to being synthesized.

Creating (612) text (616) and markup (618) for the aggregated content (404) in accordance with the identified markup language (610) such that a browser capable of rendering the text and markup may render from the translated content the some or all of the aggregated content prior to being synthesized may include augmenting the content during translation in some way. That is, translating aggregated content into text and markup may result in some modification to the original aggregated content or may result in deletion of some content that cannot be accurately translated. The quantity of such modification and deletion will vary according to the type of data being translated as well as other factors as will occur to those of skill in the art.

Consider for further explanation the following markup language depiction of a snippet of audio clip describing the president.

```
<head> original file type= 'MP3' keyword = 'president' number= '50',
keyword = 'air force' number = '1' keyword = 'white house' number = '2'>
</head>
    <content>
        Some content about the president
    </content>
```

In the example above, an MP3 audio file is translated into text and markup. The header in the example above identifies the translated data as having been translated from an MP3 audio file. The exemplary header also includes keywords included in the content of the translated document and the frequency with which those keywords appear. The exemplary translated data also includes content identified as 'some content about the president.'

As discussed above, one useful markup language for synthesizing content is XHTML plus Voice. XHTML plus Voice ('X+V') is a Web markup language for developing multimodal applications, by enabling speech navigation and interaction through voice markup. X+V provides speech-based interaction in devices using both voice and visual elements. Speech enabling the synthesized data for consolidated content management according to embodiments of the present invention is typically carried out by creating grammar sets for the text of the synthesized content. A grammar is a set of words that may be spoken, patterns in which those words may be spoken, or other language elements that define the speech recognized by a speech recognition engine in a multimodal browser. Such speech recognition engines are useful in rendering synthesized data to provide users with voice navigation of and voice interaction with synthesized content.

As discussed above, synthesized content may be speech enabled. For further explanation, therefore, FIG. 13 sets forth an exemplary method synthesizing content of disparate data types into synthesized content including data of a uniform data type single point access by a user that includes dynamically creating (626) grammar sets (628) for the text content (606). As discussed above, a grammar is a set of words that may be spoken, patterns in which those words may be spoken, or other language elements that define the speech recognized by a speech recognition engine in a multimodal browser or other rendering application supported by a rendering device.

Dynamically creating grammar sets (628) for the text content (606) may be carried out by identifying (630) keywords (632) for the text content (606). Identifying (630) keywords (632) for the text content (606) may include identifying keywords in the text content (606) determinative of content or logical structure and including the identified keywords in a grammar associated with the text content. Keywords determinative of content are words and phrases defining the topics of the synthesized content and the information presented the synthesized content. Keywords determinative of logical structure are keywords that suggest the form in which information of the synthesized content is presented. Examples of logical structure include typographic structure, hierarchical structure, relational structure, and other logical structures as will occur to those of skill in the art.

Identifying keywords in the text determinative of content may be carried out by searching the translated text for words that occur in the text more often than some predefined threshold. The frequency of the word exceeding the threshold indicates that the word is related to the content of the translated text because the predetermined threshold is established as a frequency of use not expected to occur by chance alone. Alternatively, a threshold may also be established as a function rather than a static value. In such cases, the threshold value for frequency of a word in the translated text may be established dynamically by use of a statistical test which compares the word frequencies in the translated text with expected frequencies derived statistically from a much larger corpus. Such a larger corpus acts as a reference for general language use.

Identifying keywords in the translated text determinative of logical structure may be carried out by searching the translated text for predefined words determinative of structure. Examples of such words determinative of logical structure include 'introduction,' 'table of contents,' 'chapter,' 'stanza,' 'index,' and many others as will occur to those of skill in the art.

Dynamically creating (626) grammar sets (628) for the text content (606) may also be carried out by creating (634) grammars (628) in dependence upon the keywords (632) and grammar creation rules (636). Grammar creation rules are a pre-defined set of instructions and grammar form for the production of grammars. Creating grammars in dependence upon the identified keywords and grammar creation rules may be carried out by use of scripting frameworks such as JavaServer Pages, Active Server Pages, PHP, Perl, XML from translated data. Such dynamically created grammars may be stored externally and referenced, in for example, X+V the <grammar src=""/> tag that is used to reference external grammars.

Figure 13:
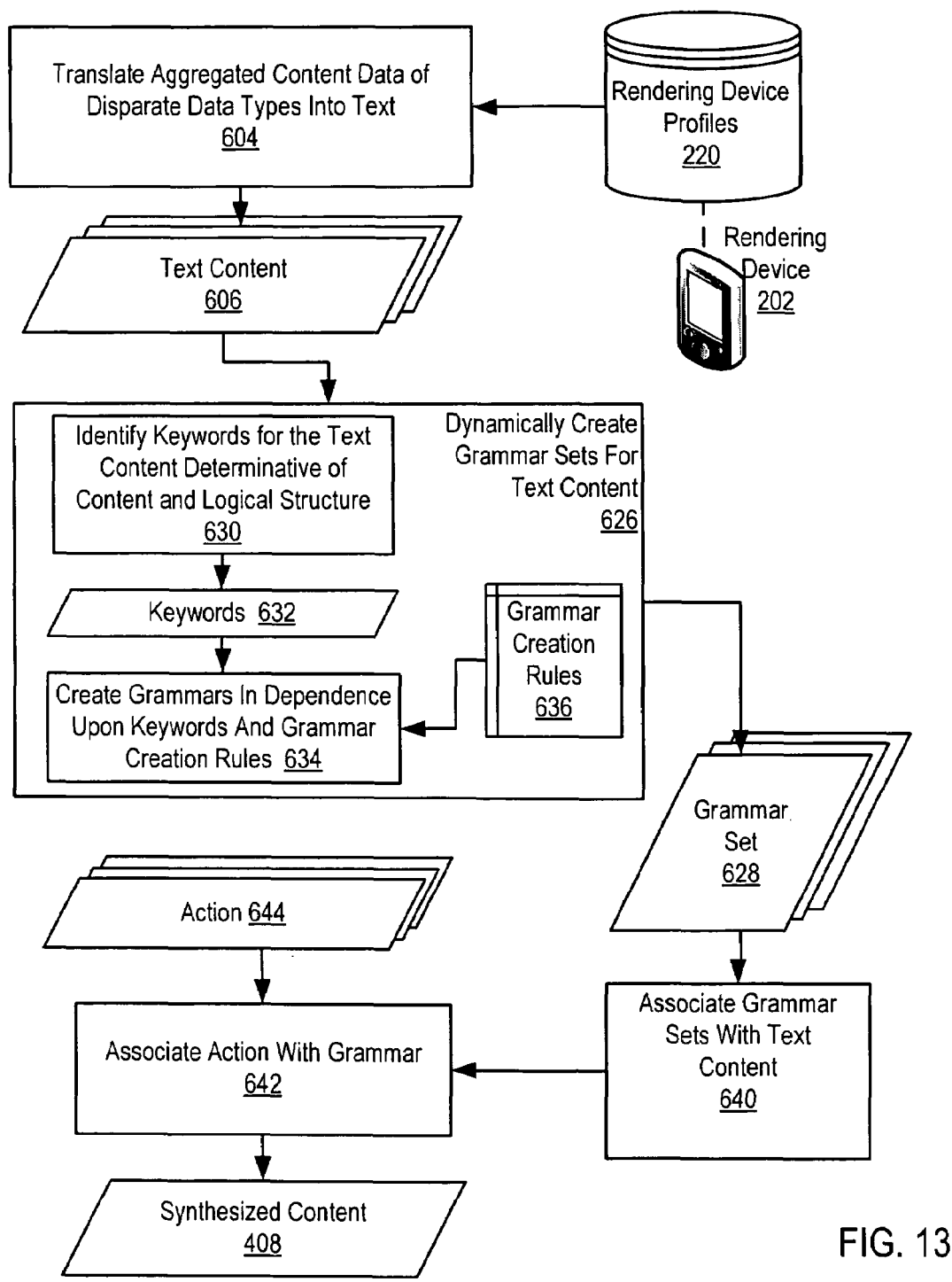
FIG. 13 sets forth a flow chart illustrating an exemplary method for creating text and markup for the aggregated content in accordance with the identified markup language.
Figure 14:
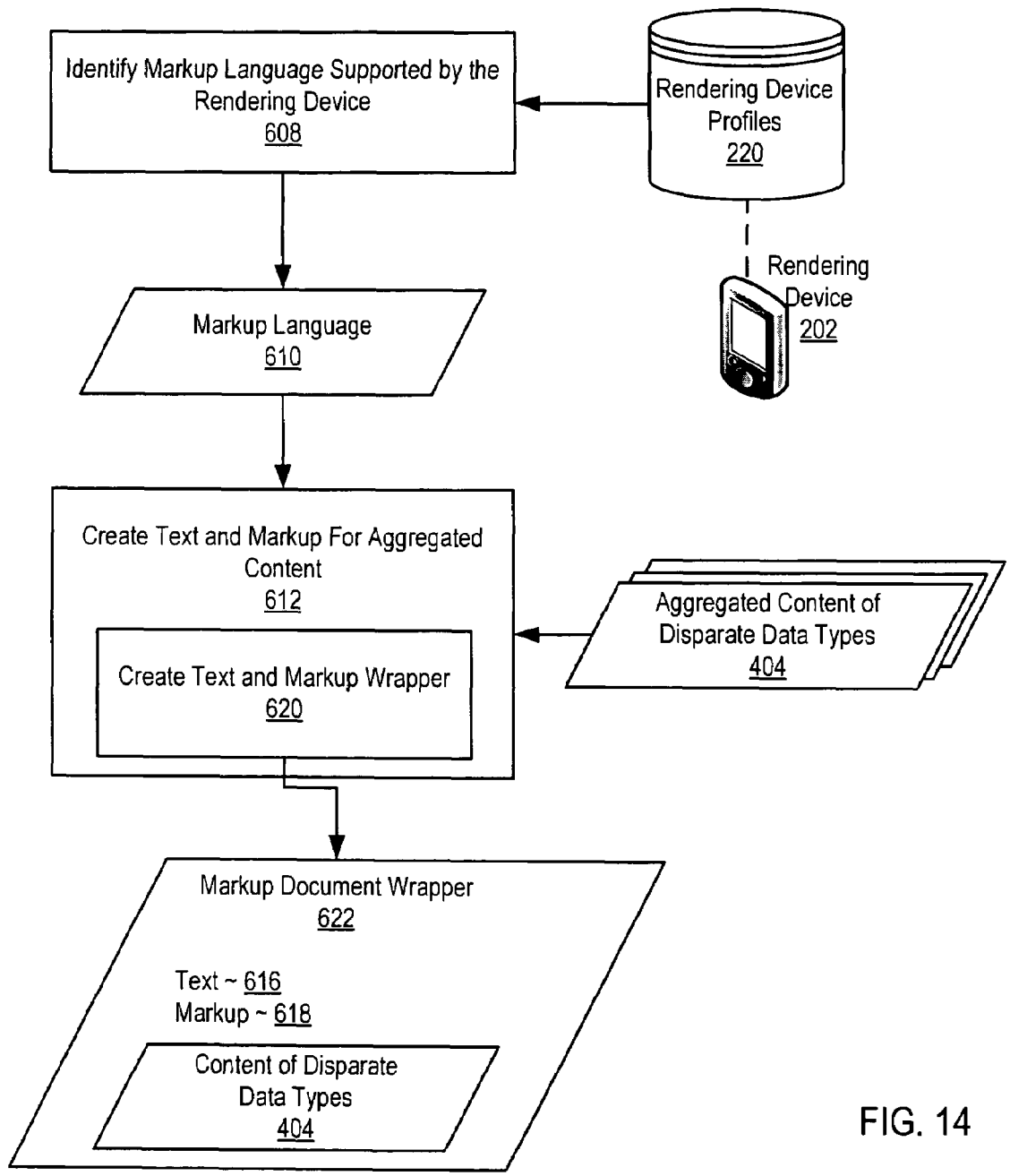
FIG. 14 sets forth a flow chart illustrating an exemplary method synthesizing content of disparate data types into synthesized content including data of a uniform data type single point access by a user that includes dynamically creating grammar sets for the text content.

The method of FIG. 13 also includes associating (640) the grammar sets (628) with the text content (606). Associating the grammar sets with the text content includes inserting markup in a markup document containing the translated text. Inserting markup in the markup document containing the translate text may be carried out by creating markup defining the dynamically created grammar sets inserting the created markup into a markup document.

The method of FIG. 13 also includes associating (642) one or more actions (644) with the grammar sets (628). An action is a set of computer instructions that when executed carry out a predefined task. Associating an action with the grammar sets thereby provides for voice initiation of the action such that the associated action is invoked in response to the recognition of one or more words or phrases of the grammar sets.

In examples above, synthesis of the aggregated content results in the replacement of the original aggregated content with synthesized content. This is for explanation, and not for limitation. In fact, in some cases some or all of the original aggregated content is preserved. Creating text and markup for the aggregated content in accordance with the identified markup language may also be carried out by preserving the data type of the aggregated content and also creating a markup document for presentation of the content in a rendering device and for invoking the rendering of the content in the rendering device. For further explanation, therefore, FIG. 14 sets forth a flow chart illustrating an exemplary method for creating (612) text (616) and markup (618) for the aggregated content (404) in accordance with the identified markup language (610) that includes creating (620) a wrapper (622) for invoking the aggregated content (404) on the rendering device (202). The wrapper (622) for invoking the aggregated content (404) on the rendering device (202) is typically a markup document created in a markup language supported by the rendering device for presentation of the presence of the content on the rendering device and for invoking the rendering of the content on the rendering device.

Some useful rendering devices do not support browsers for rendering markup documents. For example, some digital audio players play media files, such as MP3 files but have no browser. For further explanation, therefore, FIG. 15 sets forth a flow chart illustrating an exemplary method for translating (604) the aggregated content (404) into text content in accordance with device profiles (220) for an identified rendering (202) device that does not rely on a device supporting a browser to render a markup document. The method of FIG. 15 includes creating (646) text (648) in dependence upon the aggregated content (404). Creating (646) text (648) in dependence upon the aggregated content (404) typically includes extracting or inferring text content from the aggregated data for rendering on the rendering device. For example, the text of an email may be extracted from an email message for rendering on a digital audio player.

Figure 15:
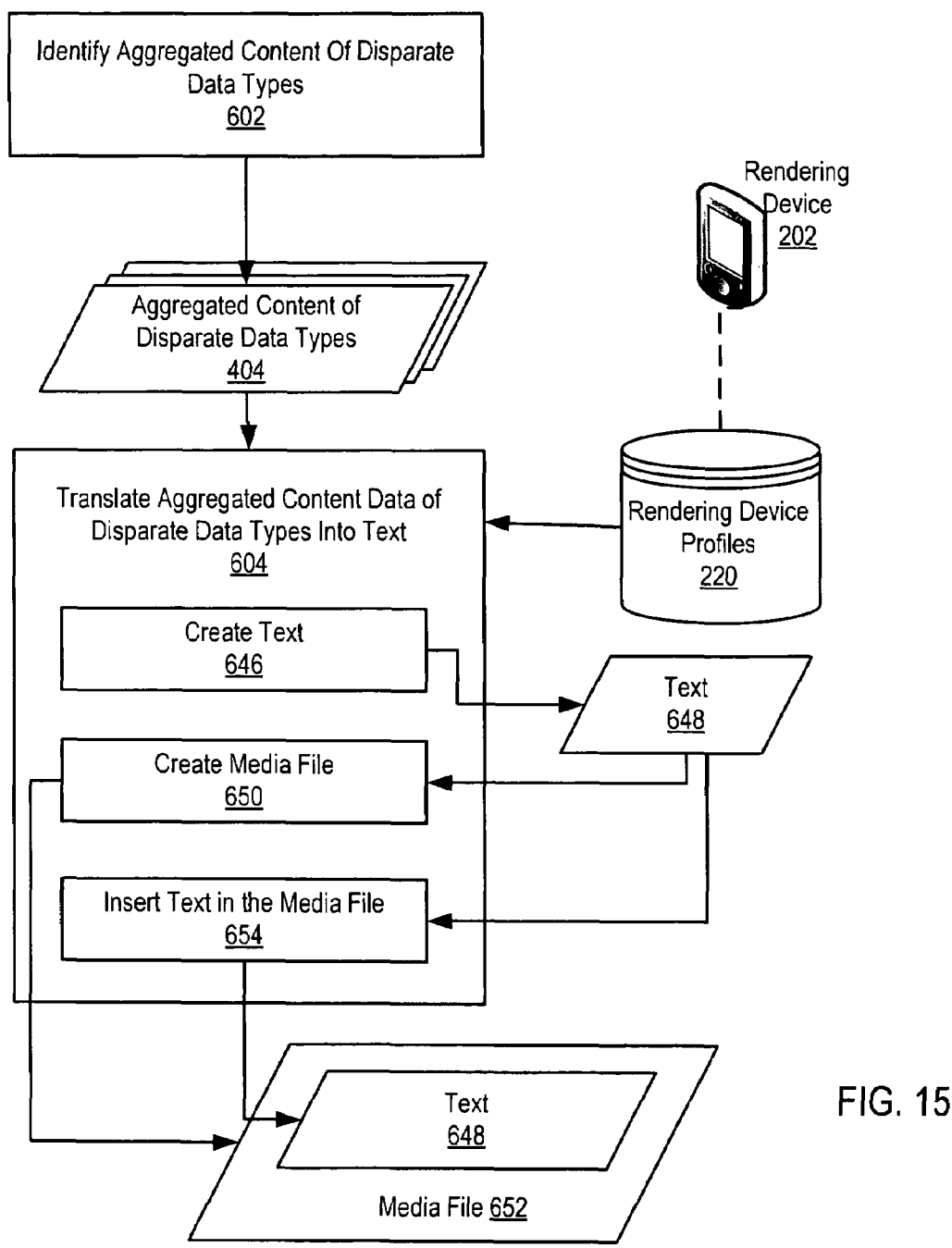
FIG. 15 sets forth a flow chart illustrating an exemplary method for translating the aggregated content into text content in accordance with device profiles for an identified rendering device.

The method of FIG. 15 also includes creating (650) a media file (652) for the text content (648). Examples of media files include MP3 files, wav files, and others that will occur to those of skill in the art.

The method of FIG. 15 also includes inserting (654) the text (648) in the media file (652). Media files such as, for example, MP3 files support header fields capable of storing the created text. Inserting (654) the text (648) in the media file (652) advantageously allows a media player such as a digital audio player to render content synthesized from other data types such as email content, calendar content, RSS content, and other content as will occur to those of skill in the art.

Publishing Synthesized Content Through RSS Feeds

Figure 16:
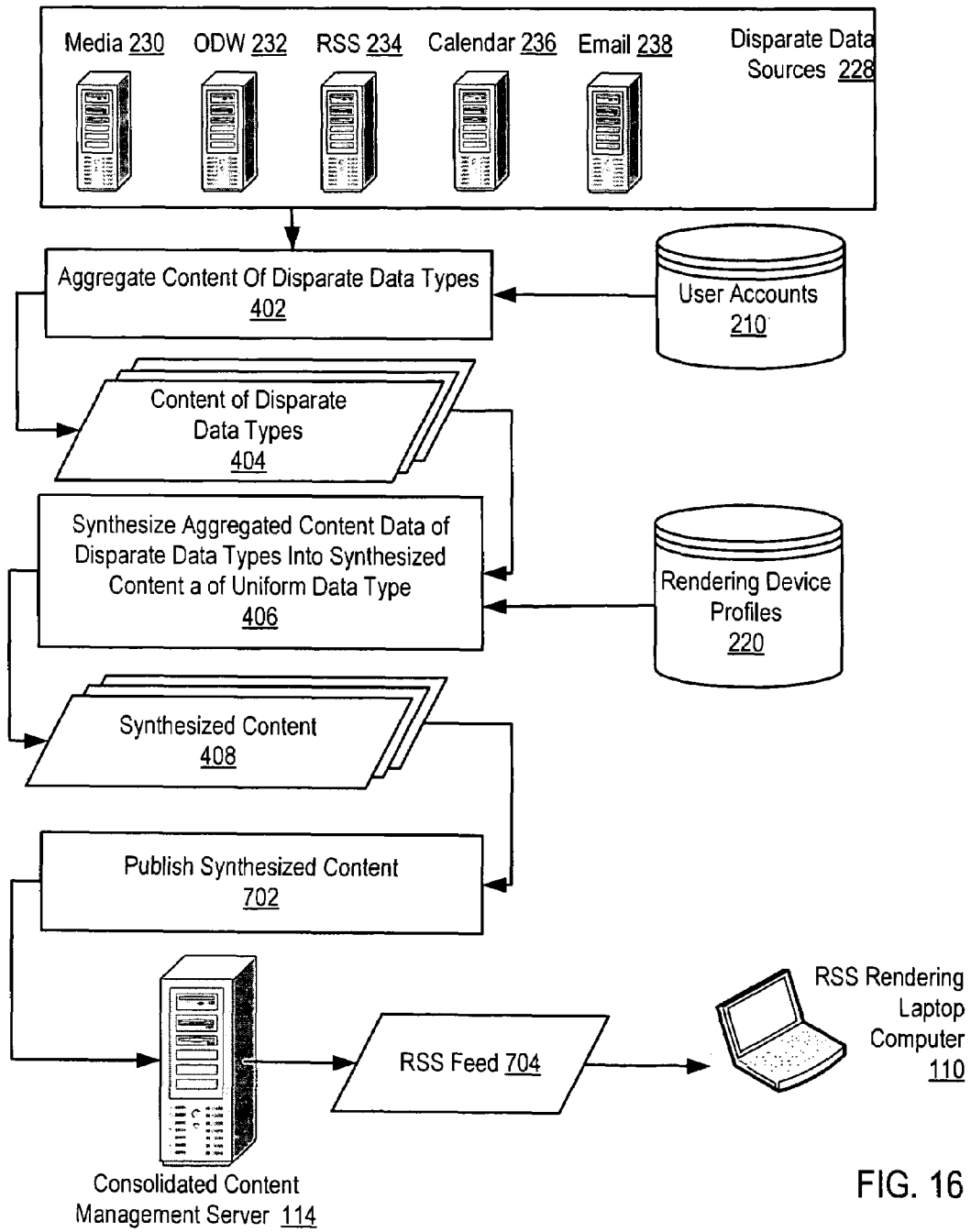
FIG. 16 sets forth a flow chart illustrating a computer-implemented method for publishing content.

Consolidated content management provides a single point of access for content aggregated and synthesized for a user. Such content may also advantageously be published. For further explanation, FIG. 16 sets forth a flow chart illustrating an exemplary computer-implemented method for publishing content. The method of FIG. 16 includes aggregating (402), for a user, content (404) of disparate data types from disparate data sources (228). Aggregating (402), for a user, content (404) of disparate data types from disparate data sources (228) according to the method of FIG. 16 is carried out in dependence upon user accounts (210) established for a user that contain identifications of user selected data sources for aggregation and identifications of one or more rendering devices upon which synthesized content is to be rendered. Aggregating, for a user, content of disparate data types from disparate data sources may be carried out by establishing a user account for the user; retrieving content of disparate data types from identified disparate data sources associated with the user account; storing the retrieved content; and associating the stored content with the user account as discussed in more detail above with reference to FIGS. 7-10.

The method of FIG. 16 also includes synthesizing (406) the aggregated content (404) of disparate data types into synthesized content (408) including data of a uniform data type for delivery to a particular RSS rendering device (110). Synthesized content is content derived from aggregated data which has been synthesized for rendering upon a particular rendering device. That is, the content of the aggregated data is synthesized into data of a data type that a particular rendering device supports.

Synthesizing aggregated content of disparate data types into synthesized content including data of a uniform data type for delivery to a particular RSS rendering device is typically carried out in dependence upon device profiles (220) for the RSS rendering device identifying attributes of the particular rendering device such a file formats the RSS rendering device supports, markup languages the RSS rendering device supports, data communications protocols the RSS rendering device supports and other attributes as will occur to those of skill in the art as discussed above with reference to FIG. 11-14.

The method of FIG. 16 also includes publishing (702) the synthesized content (408) through an RSS feed (704). An RSS feed is typically implemented as one or more XML files containing summaries of web content accompanied by links to more extensive versions of the content at a RSS content source, as well as other meta-data. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). RSS is a format often used for syndicating news and the content of news-like sites, including major news sites, news-oriented community sites, and personal weblogs. RSS allows users to see some of a web site's content, in the form of items which are created from the website's associated RSS feed, without requiring the user to visit the web site directly. If the user would like to view the full content of the item, the user may activate a link to browse the website featuring the full content of the channel or item.

As discussed above, an RSS feed is typically implemented as one or more XML files containing links to more extensive versions of content. For further explanation, FIG. 17 sets forth a flow chart illustrating an exemplary method for publishing the synthesized content through an RSS feed. The method of FIG. 17 includes establishing (706) one or more hyperlinks (708) to the synthesized content, inserting (710) in an RSS feed (704) the one or more hyperlinks (708) and associating (714) in the RSS feed (704) with each hyperlink (708) metadata (712) describing the synthesized content accessible through the hyperlink (708). Metadata (712) describing the synthesized content accessible through the hyperlink (708) often includes summaries of the synthesized content accessible through the hyperlink such that a user may be informed of the synthesized content accessible through the hyperlink.

The hyperlinks and associated metadata may provide an RSS channel to synthesized content. An RSS channel is typically a container for an arbitrary number of items of a similar type, having some relationship which is defined by the context of the container. An RSS channel to synthesized content may be a reverse-chronological sorted list of links to synthesized content, along with metadata describing aspects the synthesized content story often indicating the title of content and a description of the content.

Each RSS channel is designated by markup in the RSS feed's XML files and has required sub-elements which are also designated by markup. Required sub-elements of an RSS channel typically include a title to name the RSS channel, a link, and a description. The link is the URL of the synthesized content typically implemented as a web page, such as, for example, a web page written in HTML. Each RSS channel may also contain optional sub-elements. Optional sub-elements of an RSS channel include, for example, an image sub-element, which provides for an image to be displayed in connection with the RSS channel.

Figure 17:
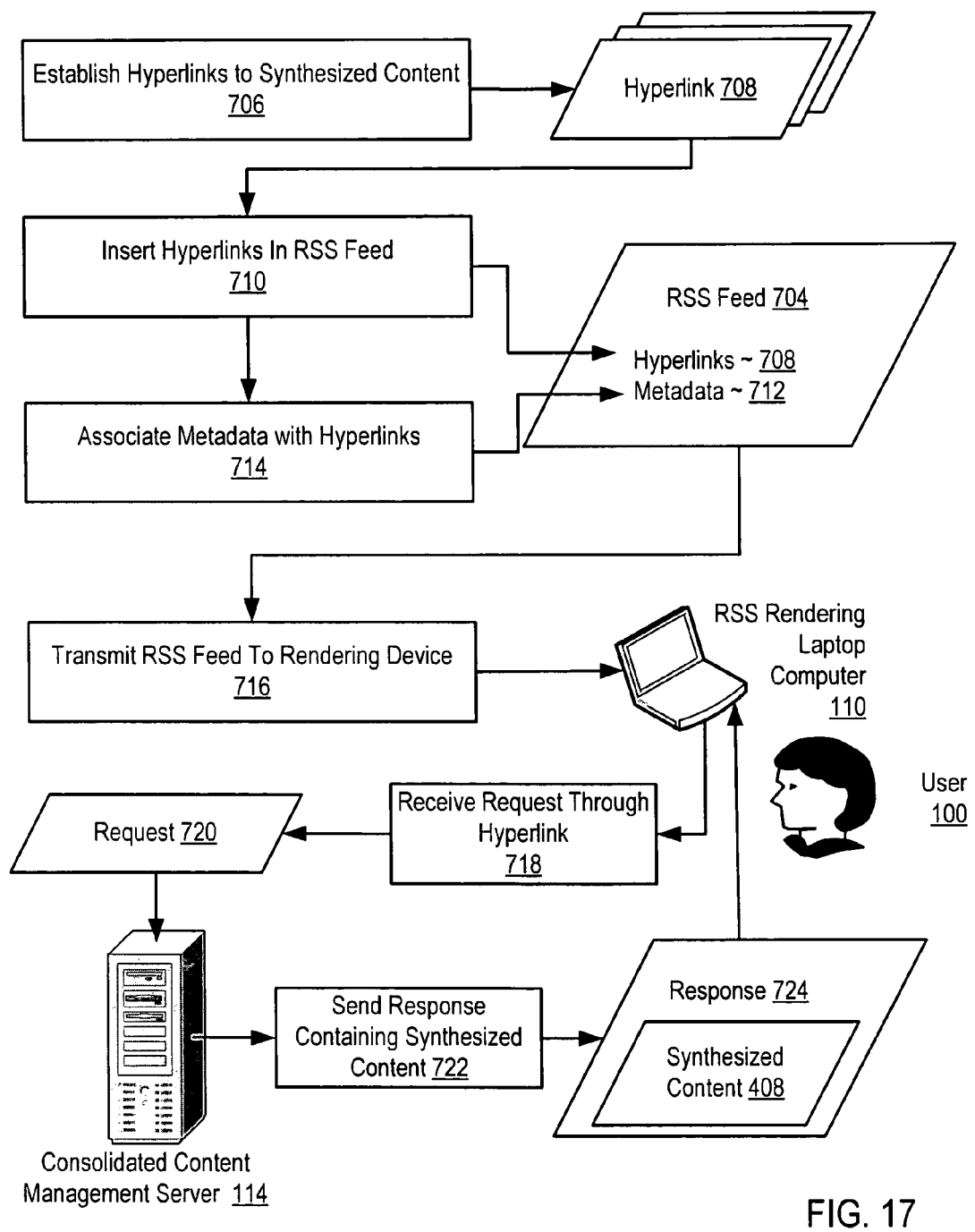
FIG. 17 sets forth a flow chart illustrating an exemplary method for publishing the synthesized content through an RSS feed.

The method of FIG. 17 also includes transmitting (716) the RSS feed (704) to a rendering device (110). Transmitting (716) the RSS feed (704) to a rendering device (110) may be carried out by selecting a data communications protocol supported by the RSS rendering device (110) and sending the RSS feed to the RSS rendering device according to the selected data communications protocol.

The method of FIG. 17 also includes receiving (718) a request (720) for the synthesized content through an invocation of a hyperlink (708) in the RSS feed (704). A user may invoke a hyperlink in the RSS feed through, for example, a mouse or keystroke.

The method of FIG. 17 also includes sending (722) to the rendering device (110), in response to the request (720), a response (724) containing the synthesized content (408). Sending (722) to the rendering device (110), in response to the request (720), a response (724) containing the synthesized content (408) provide to a user synthesized content for rendering on the RSS rendering device.

Exemplary embodiments of the present invention are described largely in the context of a fully functional computer system for consolidated content management. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for consolidated content management for delivery to a rendering device, the method comprising:
   aggregating, for a user, content of disparate data types and disparate file types from disparate data sources;
   synthesizing the aggregated content of disparate data types and disparate file types into synthesized content of a data type and particular file type for delivery to the rendering device, further comprising:
      creating text in dependence upon the aggregated content;
      creating a media file for the synthesized content, wherein the media file includes digital audio content; and
      inserting the text in a header of the media file;
   wherein the rendering device is one of a plurality of available disparate rendering devices;
   receiving from the rendering device a request for the synthesized content; and
   transmitting, in a response to the request, the requested synthesized content to the rendering device.

2. The method of claim 1 wherein aggregating, for a user, content of disparate data types and disparate file types from disparate data sources further comprises:
   establishing a user account for the user;
   retrieving content of disparate data types from identified disparate data sources associated with the user account;
   storing the retrieved content; and
   associating the stored content with the user account.

3. The method of claim 1 wherein synthesizing the aggregated content of disparate data types and disparate file types into synthesized content of a data type and particular file type for delivery to the rendering device further comprises:

identifying at least a portion of the aggregated content for delivery to the rendering device; and translating the portion of the aggregated content into text content and markup associated with the text content in accordance with device profiles for the rendering device.

4. The method of claim 1 wherein transmitting, in a response to the request, the requested synthesized content to the rendering device further comprises:

selecting a protocol for transmission to the rendering device in dependence upon a device profile of the rendering device; and sending the synthesized content to the rendering device in accordance with the protocol.

5. The method of claim 1 further comprising:

identifying a rendering action for execution by the rendering device; and rendering the synthesized content, by the rendering device, in accordance with the rendering action.

6. A system for consolidated content management for delivery to a rendering device, the system comprising:

a computer processor;

a computer memory operatively coupled to the computer processor;

the computer memory having disposed within it computer program instructions capable of:

aggregating, for a user, content of disparate data types and disparate file types from disparate data sources;

synthesizing the aggregated content of disparate data types and disparate file types into synthesized content of a data type and particular file type for delivery to the rendering device, further comprising:

creating text in dependence upon the aggregated content;

creating a media file for the synthesized content, wherein the media file includes digital audio content; and inserting the text in a header of the media file;

wherein the rendering device is one of a plurality of available disparate rendering devices;

receiving from the rendering device a request for the synthesized content; and transmitting, in a response to the request, the requested synthesized content to the rendering device.

7. The system of claim 6 wherein computer program instructions capable of aggregating, for a user, content of disparate data types and disparate file types from disparate data sources further comprise computer program instructions capable of:

establishing a user account for the user;

retrieving content of disparate data types from identified disparate data sources associated with the user account;

storing the retrieved content; and associating the stored content with the user account.

8. The system of claim 6 wherein computer program instructions capable of synthesizing the aggregated content of disparate data types and disparate file types into synthesized content of a data type and particular file type for delivery to the rendering device further comprise computer program instructions capable of:

identifying at least a portion of the aggregated content for delivery to the rendering device; and translating the portion of the aggregated content into text content and markup associated with the text content in accordance with device profiles for the rendering device.

9. The system of claim 6 wherein computer program instructions capable of transmitting, in a response to the request, the requested synthesized content to the rendering device further comprise computer program instructions capable of:

selecting a protocol for transmission to the rendering device in dependence upon a device profile of the rendering device; and sending the synthesized content to the rendering device in accordance with the protocol.

10. The system of claim 6 wherein the computer memory also has disposed with it computer program instructions capable of:

identifying a rendering action for execution by the rendering device; and rendering the synthesized content, by the rendering device, in accordance with the rendering action.

11. A computer program product for consolidated content management for delivery to a rendering device, the computer program product embodied on a computer-readable recording medium, the computer program product comprising:

computer program instructions for aggregating, for a user, content of disparate data types and disparate file types from disparate data sources;

computer program instructions for synthesizing the aggregated content of disparate data types and disparate file types into synthesized content of a data type and particular file type for delivery to the rendering device, further comprising:

computer program instructions for creating text in dependence upon the aggregated content;

computer program instructions for creating a media file for the synthesized content, wherein the media file includes digital audio content; and computer program instructions for inserting a text in the header of the media file;

wherein the rendering device is one of a plurality of available disparate rendering devices;

computer program instructions for receiving from the rendering device a request for the synthesized content; and computer program instructions for transmitting, in a response to the request, the requested synthesized content to the rendering device.

12. The computer program product of claim 11 wherein computer program instructions for aggregating, for a user, content of disparate data types and disparate file types from disparate data sources further comprise:

computer program instructions for establishing a user account for the user;

computer program instructions for retrieving content of disparate data types from identified disparate data sources associated with the user account;

computer program instructions for storing the retrieved content; and computer program instructions for associating the stored content with the user account.

13. The computer program product of claim 11 wherein computer program instructions for synthesizing the aggregated content of disparate data types and disparate file types into synthesized content of a data type and particular file type for delivery to the rendering device further comprise:

computer program instructions for identifying at least a portion of the aggregated content for delivery to the rendering device; and computer program instructions for translating the portion of the aggregated content into text content and markup associated with the text content in accordance with device profiles for the rendering device.

14. The computer program product of claim 11 wherein computer program instructions for transmitting, in a response to the request, the requested synthesized content to the rendering device further comprise:
 computer program instructions for selecting a protocol for transmission to the rendering device in dependence upon a device profile of the rendering device; and
 computer program instructions for sending the synthesized content to the rendering device in accordance with the protocol.

15. The computer program product of claim 11 further comprising:
 computer program instructions for identifying a rendering action for execution by the rendering device; and
 computer program instructions for rendering the synthesized content, by the rendering device, in accordance with the rendering action.

* * * * *